United States Patent
Herbst et al.

(10) Patent No.: US 10,292,241 B1
(45) Date of Patent: May 14, 2019

(54) LIGHTING CONTROL SYSTEM AND DEVICES

(71) Applicant: REVOLUTION LIGHTING TECHNOLOGIES, INC., Stamford, CT (US)

(72) Inventors: Joseph E. Herbst, Newberg, OR (US); Nicholas G. Preiser, Portland, OR (US); Ward Ramsdell, Hillsboro, OR (US)

(73) Assignee: Revolution Lighting Technologies, Inc., Stamford, CT (US)

( * ) Notice: Subject to any disclaimer, the term of this patent is extended or adjusted under 35 U.S.C. 154(b) by 0 days.

(21) Appl. No.: 15/788,325

(22) Filed: Oct. 19, 2017

(51) Int. Cl.
  *H05B 37/02* (2006.01)
  *G05B 15/02* (2006.01)

(52) U.S. Cl.
  CPC ......... *H05B 37/0227* (2013.01); *G05B 15/02* (2013.01); *H05B 37/0263* (2013.01); *H05B 37/0272* (2013.01); *H05B 37/0218* (2013.01)

(58) Field of Classification Search
  CPC ............ H05B 37/0227; H05B 37/0245; H05B 37/0254; H05B 37/0272
  USPC ......................................................... 315/312
  See application file for complete search history.

(56) References Cited

U.S. PATENT DOCUMENTS

| | | | | |
|---|---|---|---|---|
| 6,400,103 | B1* | 6/2002 | Adamson | H04L 12/2803 315/292 |
| 2005/0179404 | A1* | 8/2005 | Veskovic | H05B 37/0254 315/291 |
| 2007/0132665 | A1* | 6/2007 | Kent | H05B 33/08 345/45 |
| 2013/0026947 | A1* | 1/2013 | Economy | H04W 4/70 315/287 |
| 2014/0239817 | A1* | 8/2014 | Leinen | H05B 37/02 315/152 |
| 2017/0188438 | A1* | 6/2017 | Vollmer | H05B 37/0254 |

* cited by examiner

*Primary Examiner* — Tung X Le
(74) *Attorney, Agent, or Firm* — Barlow, Josephs & Holmes, Ltd.

(57) ABSTRACT

A lighting control system is disclosed that includes a device having a processor, a communication interface and a plurality of lighting control outputs connected to the processor, where the communication interface configured to receive a control input and the processor is configured to selectively operate the plurality of lighting control outputs based on the control input received by the communication interface.

20 Claims, 25 Drawing Sheets

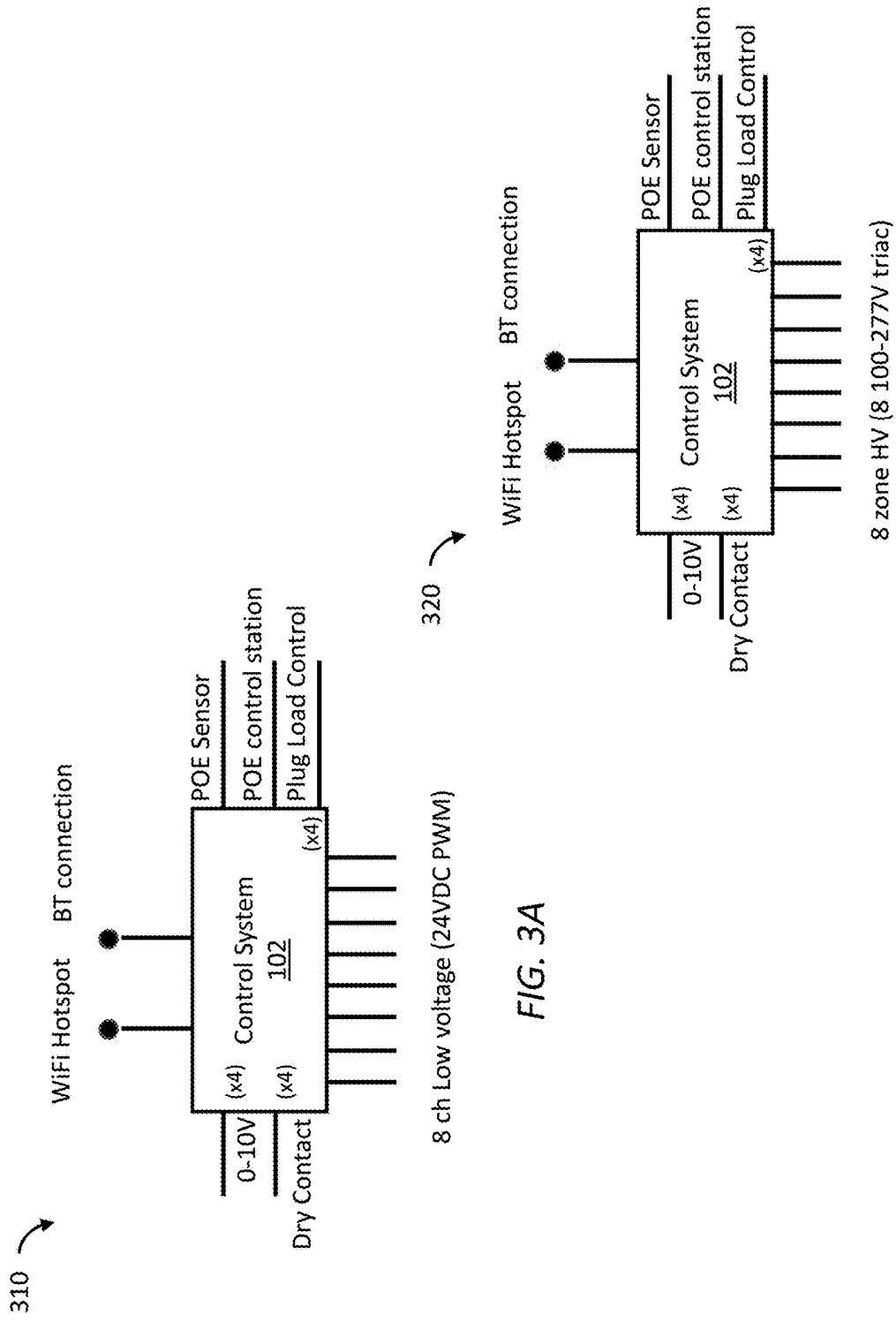

LIGHTING CONTROL SYSTEM AND DEVICES

BACKGROUND OF THE INVENTION

1. Field of the Invention

The present disclosure relates generally to lighting fixtures and devices and more particularly to a lighting control system and devices that provides a centralized, but highly customizable and expandable lighting control system.

2. Background of the Related Art

Lighting control systems are useful to conserve power and provide a centralized user experience in commercial and residential buildings. However, prior art lighting control systems are expensive and lack flexible deployment configurations that are efficient, yet still retain the benefit of being customizable and expandable.

SUMMARY OF THE INVENTION

The lighting control system is disclosed herein solves the problem of the prior art by providing a control system that includes a device having a processor, a communication interface and a plurality of lighting control outputs connected to the processor, where the communication interface is configured to receive a control input and the processor is configured to selectively operate the plurality of lighting control outputs based on the control input received by the communication interface. The control system may further support multiple control systems that may be interconnected together to control larger arrays of sensor, control inputs, such as switches, and lighting devices. Furthermore, the modular aspect of the control system permit different combinations of diverse types of lighting, including both low and high voltage lighting devices. The control system further may include a self-hosted web page of configuration settings, permitting logical grouping and scheduling of devices connected to the system, including assigning control inputs, such as sensor inputs and switch inputs, to devices and/or groups of devices connected to the system. The control system may further be configured with wireless and/or wired communication adapters to support a wide variety of devices connected to the system, including legacy and newer device communication protocols.

BRIEF DESCRIPTION OF THE DRAWINGS

These and other features, aspects, and advantages of the present invention will become better understood with reference to the following description, appended claims, and accompanying drawings where:

FIG. 3A is a diagram of an example control system for a lighting control system and devices described herein having low voltage lighting control outputs and Bluetooth and WiFi wireless connectivity;

FIG. 3B is a diagram of an example control system for a lighting control system and devices described herein having high voltage and low voltage lighting control outputs and Bluetooth and WiFi wireless connectivity;

FIG. 5I is an example hosted web page for viewing usage history of lighting devices of the system;

DESCRIPTION OF THE PREFERRED EMBODIMENTS

The following detailed description of exemplary implementations refers to the accompanying drawings. The same reference numbers in different drawings may identify the same or similar elements.

As will be described in greater detail below, a lighting control system includes a device having a processor, a communication interface and a plurality of lighting control outputs connected to the processor, where the communication interface configured to receive a control input and the processor is configured to selectively operate the plurality of lighting control outputs based on the control input received by the communication interface.

Figure 1A:
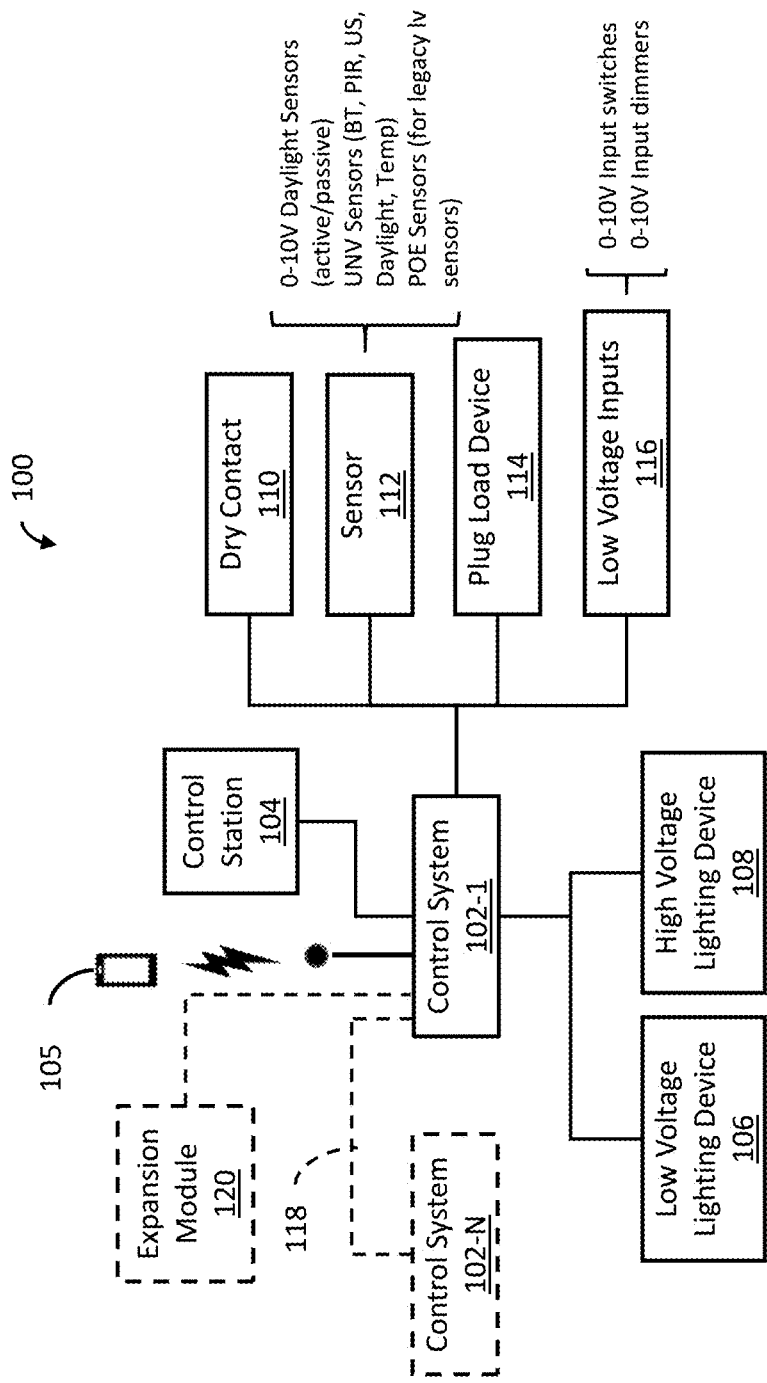
FIG. 1A is a diagram of an overview of the lighting control system and devices described herein.

FIG. 1A is a diagram of an overview of a lighting control system and devise 100 as described herein. The system 100 generally includes one or more control systems 102 that are interconnected to control stations 104, low voltage lighting devices 106, high voltage lighting devices 108, dry contact 110, sensors 112, plug load controllers 114, and/or low voltage inputs 116. Interaction with control system 102 may be through a wireless control interface 105, such as a smartphone, analog wire interface 112, and/or digital wire control interface 114 in addition to dry contacts 110 and low voltage inputs 116 and other wireless inputs, such as EnOcean-enabled wall switches and sensors, for example. Where multiple control systems 102 are used, they may be interconnected via a wired or wireless communication mechanism 118, such as communication interface 270 described further below, in order to expand the system to control more lighting and devices. In an example embodiment, controller 102 generates pulse width modulated ("PWM") and/or variable pulse width modulated ("VPWM") control signals to control low voltage lighting devices 106. In another example embodiment, control system 102 controls high voltage lighting devices using one or more TRIACs (i.e. bidirectional or bilateral triode thyristors). The number of devices may be further expanded by adding expansion modules 120 to the control system 102 to allow for additional connections of lighting control inputs and outputs, control stations and/or sensors.

Embodiments of the control system 102 may include a wireless communication interface 270 which may include IEEE 802.11, Bluetooth, and/or other RF communications methods, such as ZigBee (IEEE 802.15.4), EnOcean, Z-Wave, Bluetooth and the like. A user may initiate commands to the control system 102 with a mobile device, such as a smartphone, tablet computer, a wall control station, laptop or desktop computing device, and the like, as illustrated as 104 and 105, and described further below.

Plug load controllers 114 may be configured to switch off heating and air conditioning circuits ("HVAC") and other devices where vampire power consumption is a concern. By way of example and not limitation, a model RIBETAOISB enclosed relay, manufactured by Functional Devices, Inc., may be connected to the control system 102. Other circuit loads may be controlled, such as to electrical receptacles.

Sensors 112 may include 0-10V daylight sensors, both active and passive, UNV sensors and other legacy, power of ethernet sensors. Such sensors 112, may include temperature sensors, daylight sensors, passive infrared ("PIR"), occupancy sensors, vacancy sensors, ultrasonic, vibration, humidity, and the like. Sensors 112 may be configured as high voltage or low voltage devices. Sensors 112 may be connected to the control system 102 in wired and/or wireless configurations. Sensors 112 may be connected to a power source or have an internal power source, such as a battery or solar cell.

Figure 1B:
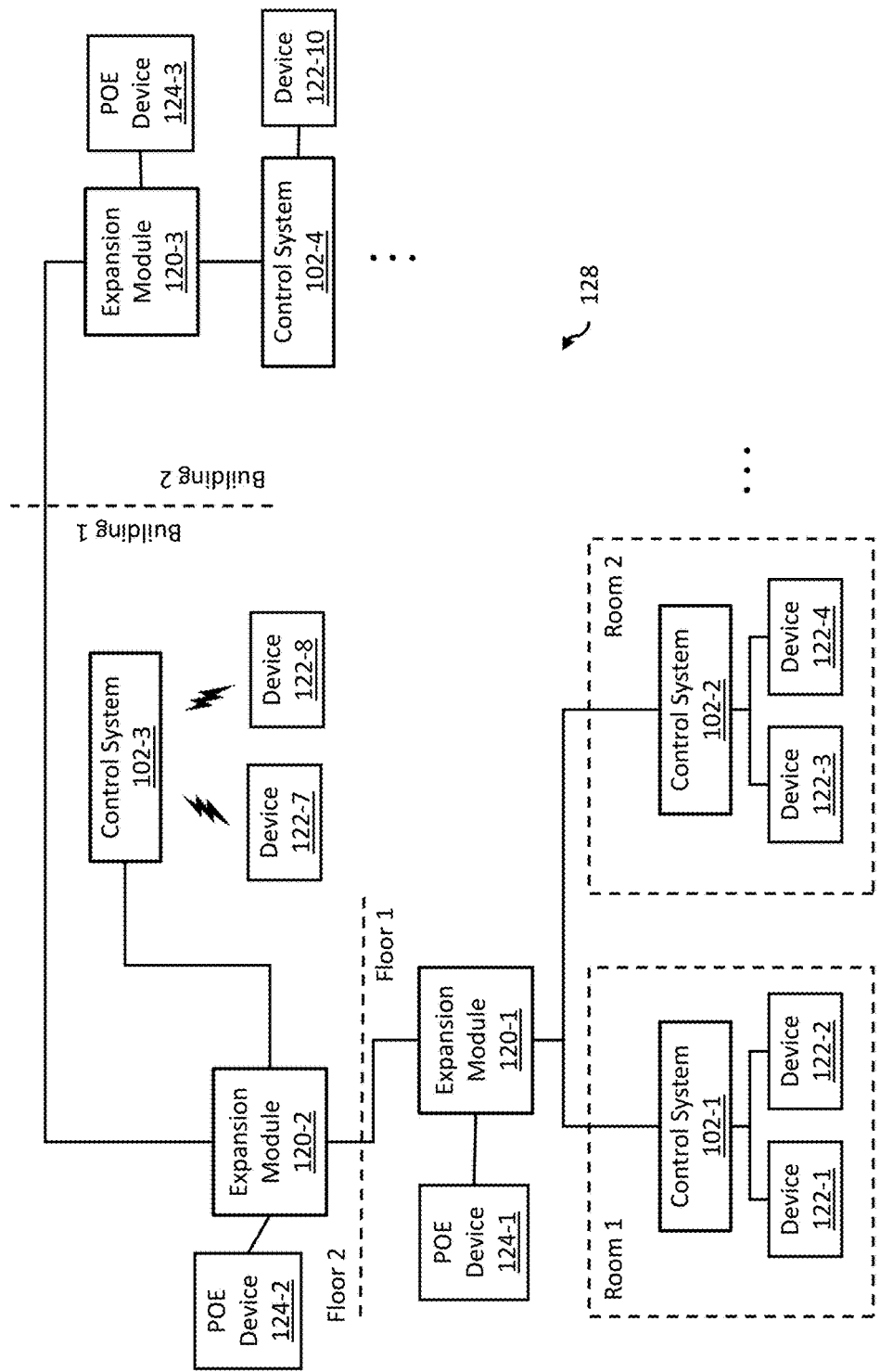
FIG. 1B is a diagram of an overview of the lighting control system illustrating how the lighting control system may be configured for use in multiple rooms, floors, and/or buildings.

Expansion module 120, may include a wired communication interface 270, such as an ethernet interface with power of ethernet ("POE") functionality to drive one or more connections to POE devices 124, such as control stations 104, sensors 112 and POE fixtures (e.g. low voltage lighting devices 106). Expansion modules 102 may be used to bridge between control systems 102, connect remote devices to a control system 102, and/or other expansion modules 120. For Example, FIG. 1B is a diagram of an example implementation 128 of the lighting control system illustrating how the lighting control system may be configured for use in multiple rooms, floors, and/or buildings. The example implementation 128 illustrates the extensibility of the lighting control system where multiple control systems 102 may be interconnected through expansion modules 120 to control various devices 122 and POE devices 124. The devices 122 may be any number and combination of control stations 104, high voltage lighting devices 108, dry contact 110, sensors 112, plug load devices 114, low voltage inputs 116. POE devices 124 may include any number or combination of control stations 104, low voltage lighting devise 106, sensors 112, low voltage inputs 116 that are configured with power over ethernet functionality. The expansion module 102 provides a less expensive alternative to interconnecting multiple control systems 102 in order to limit the number of control systems 102 needed, but still allow flexibility in controlling any number or configuration of devices 122 and POE devices 124.

Figure 2:
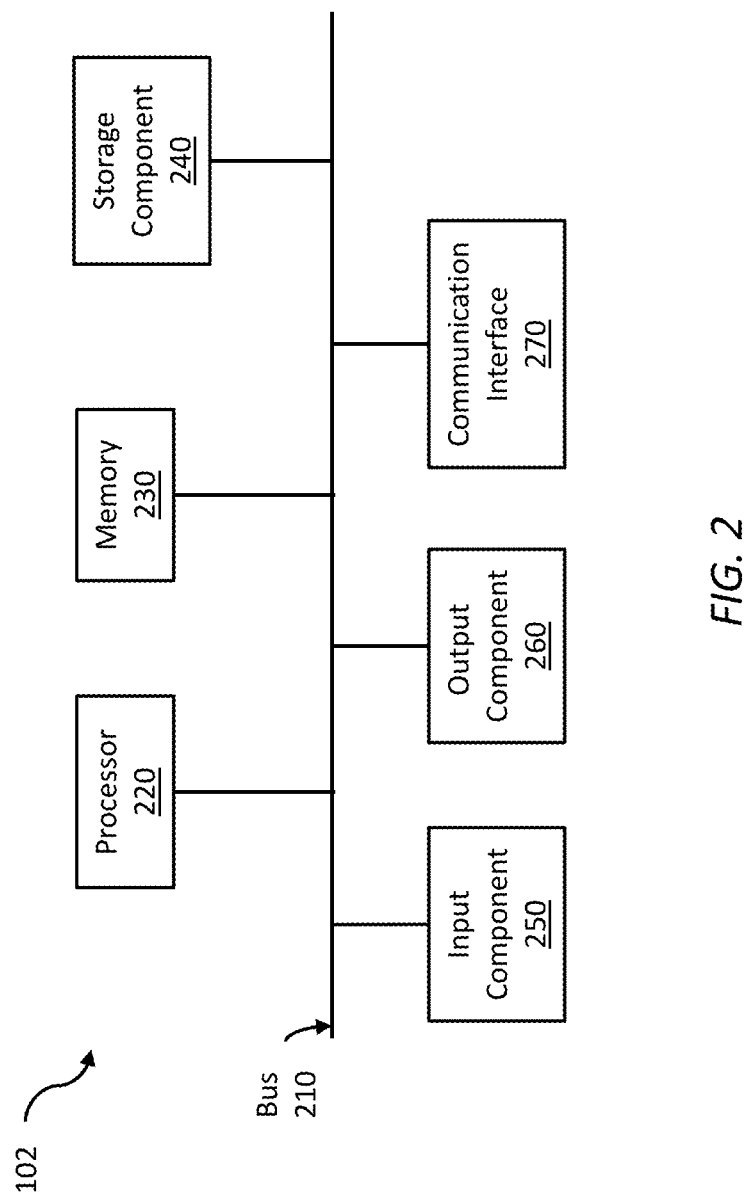
FIG. 2 is a diagram of an example components of a device which may be configured as, for example a control system, among others, for the lighting control system and devices described herein.

FIG. 2 is a diagram of example components of a device 200. Device 200 may correspond to control system 102, control station 104, expansion module, and/or user device 105. In some implementations, user device 105, control system 102, and control station 104 may include one or more devices 200 and/or one or more components of device 200. As shown in FIG. 2, device 200 may include a bus 210, a processor 220, a memory 230, a storage component 240, an input component 250, an output component 260, and a communication interface 270.

Bus 210 may include a component that permits communication among the components of device 200. Processor 220 is implemented in hardware, firmware, or a combination of hardware and software. Processor 220 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 230 may include a random access memory (RAM), a read only memory (ROM), and/or another type of dynamic or static storage device (e.g., a flash memory, a magnetic memory, an optical memory, etc.) that stores information and/or instructions for use by processor 220.

Storage component 240 may store information and/or software related to the operation and use of device 200. For example, storage component 240 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 250 may include a component that permits device 200 to receive information, such as via user input (e.g., a touch screen display, a keyboard, a keypad, a mouse, a button, a switch, a microphone, etc.). Additionally, or alternatively, input component 250 may include a sensor for sensing information (e.g., a global positioning system (GPS) component, occupancy sensor, an accelerometer, a gyroscope, an actuator, etc.). Output component 260 may include a component that provides output information from device 200 (e.g., a display, a speaker, one or more light-emitting diodes (LEDs), etc.).

Communication interface 270 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, including IEEE 802.3 power over ethernet, an optical interface, a coaxial interface, an infrared interface, a radio frequency (RF) interface, a universal serial bus (USB) interface, a Wi-Fi interface, an IEEE 802.15.4 compliant interface, a Bluetooth interface, a cellular network interface, or the like.

Device 200 may perform one or more processes described herein. Device 200 may perform these processes in response to processor 220 executing software instructions stored by a computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Several different exemplary configurations of controls systems 102 are illustrated in FIGS. 3A-3D. As examples, the exemplary control systems 102 are shown with four low voltage and four high voltage, eight low voltage and/or eight high voltage lighting control outputs 106, 108. However, different implementations may include any number of combinations of low and high voltage lighting control outputs. Furthermore, various combinations of total inputs and outputs may also be configured. In one embodiment, the control system 102 supports twenty total inputs and outputs, with eight wired and twelve wireless. Limiting the total number of inputs may reduce cost of the control system 102, but provide sufficient flexibility for installation and configuration of many residential and commercial buildings.

In FIG. 3A an example embodiment of a control system 102 is generally illustrated at 310. The control system 102 generally includes eight channels for controlling low voltage lighting devices 106, four 0-10V switch inputs for low voltage switches and dimmers, four dry contact inputs for dry contact switches 110, communication interface 270 that includes an ethernet connector for POE sensors 112 and control station 104 connectivity and wireless adapter for connecting via Wi-Fi and/or Bluetooth to other wireless sensors 112 and devices. The example embodiment 310 of the control system 102 may further include four plug load control outputs to control plug load devices 114, such as HVAC.

Figures 3C, 3D:
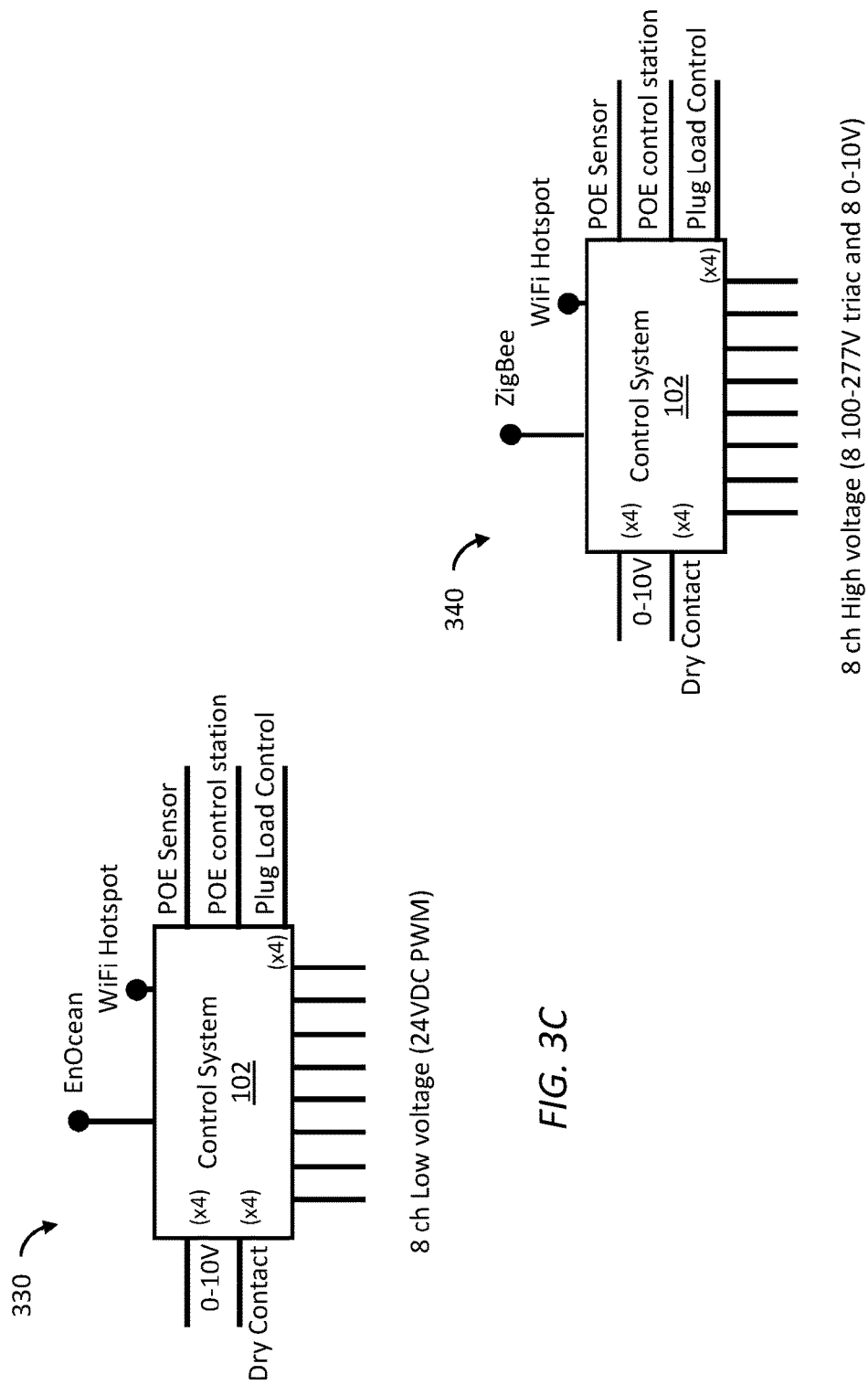
FIG. 3C is a diagram of an example control system for a lighting control system and devices described herein having low voltage lighting control outputs and EnOcean and WiFi wireless connectivity.
FIG. 3D is a diagram of an example control system for a lighting control system and devices described herein having high voltage lighting control outputs and ZigBee and WiFi wireless connectivity.

In FIG. 3B an example embodiment of a control system 102 is generally illustrated at 320. The control system 102 generally includes eight high voltage zones for controlled high voltage lighting devices 108. Like the example embodiment 310, the example embodiment 320 may also include 0-10V switch inputs, dry contact inputs, plug load controls, and communication interface 270 that includes a wireless adapter and ethernet. As will be described further below, the number of lighting control outputs may include In FIG. 3C another example embodiment of a control system 102 is shown at 330, which includes a communication interface 270 that includes a wireless adapter that supports EnOcean protocol. Like the other example embodiments described above, the control system 102 may include any number of low voltage inputs, dry contact inputs, plug load control, and mixture of low and high voltage lighting control outputs for low voltage 106 and high voltage 108 lighting devices may be configured as desired.

In FIG. 3D another example embodiment of a control system 102 is shown at 330, which includes a communication interface 270 that includes a wireless adapter that supports ZigBee protocol. Like the other example embodiments described above, the control system 102 may include any number of low voltage inputs, dry contact inputs, plug load control, and mixture of low and high voltage lighting control outputs.

Figure 4A:
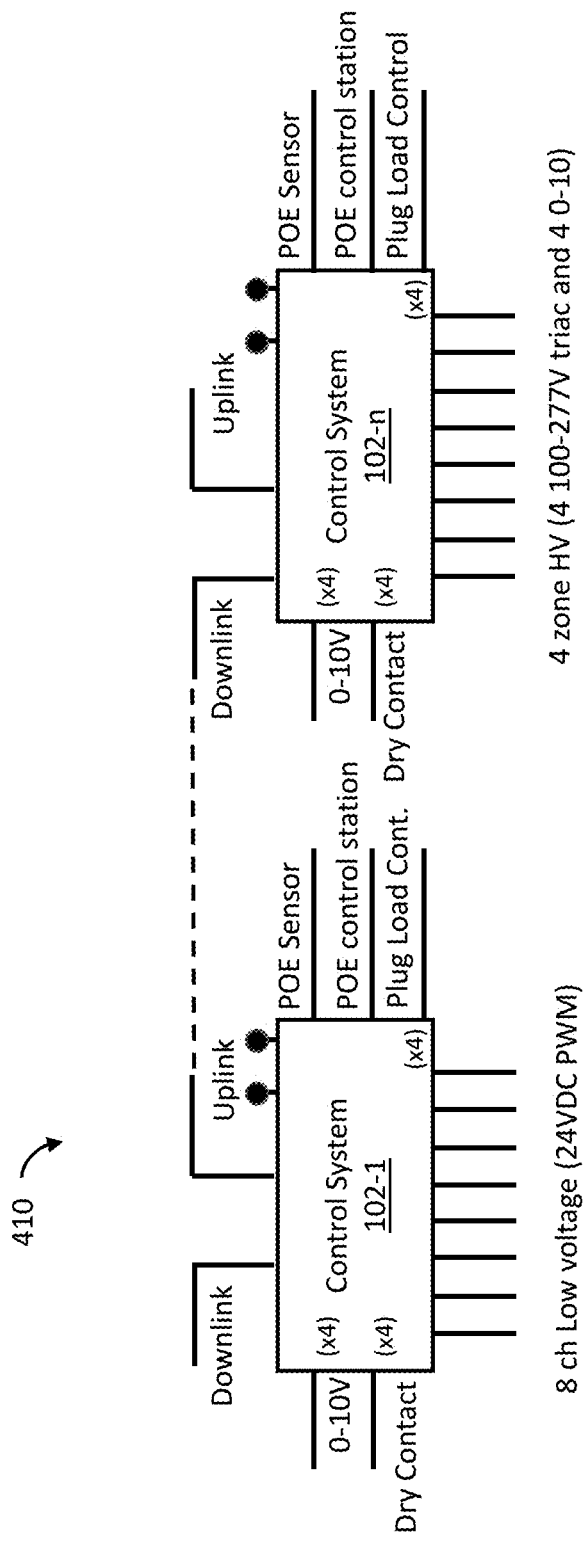
FIG. 4A is a diagram of an example lighting control system illustrating multiple control systems connected together with a wired communication interface.

In FIG. 4A an example embodiment is shown generally at 410 where the lighting control system may include multiple control systems 102-1, 102-2 connected together through the communication interface 270, such as by ethernet, in order to expand the number and configuration of lighting devices 106, 108, sensors and inputs that may be controlled by the system. For example, a control system 102-1 may have eight channels of low voltage control outputs, where a subsequent control system 102-n includes both high and low voltage control outputs. Alternatively, this connection of control systems 102-1 and 102-2 may be made through an expansion module 120, as noted above.

In some embodiments where the lighting control system where more than one control system 102 is used, one control system 102-1 may identify itself as a master device and other connected control systems 102-2, 102-n operate as slave. In other embodiments, where the lighting control system where more than one control system 102 is used, there is no centralized master control, but control of lighting devices 106, 108 is distributed through the system, control system by control system. In other embodiments, the multiple control systems 102-1, 102-2-are configured to operate independently. Regardless of the configuration, the operation of the lighting devices 106, 108 is transparent to users of the system. As noted above, the multiple control systems 102 may be interconnected by one or more expansion modules 120.

Figure 4B:
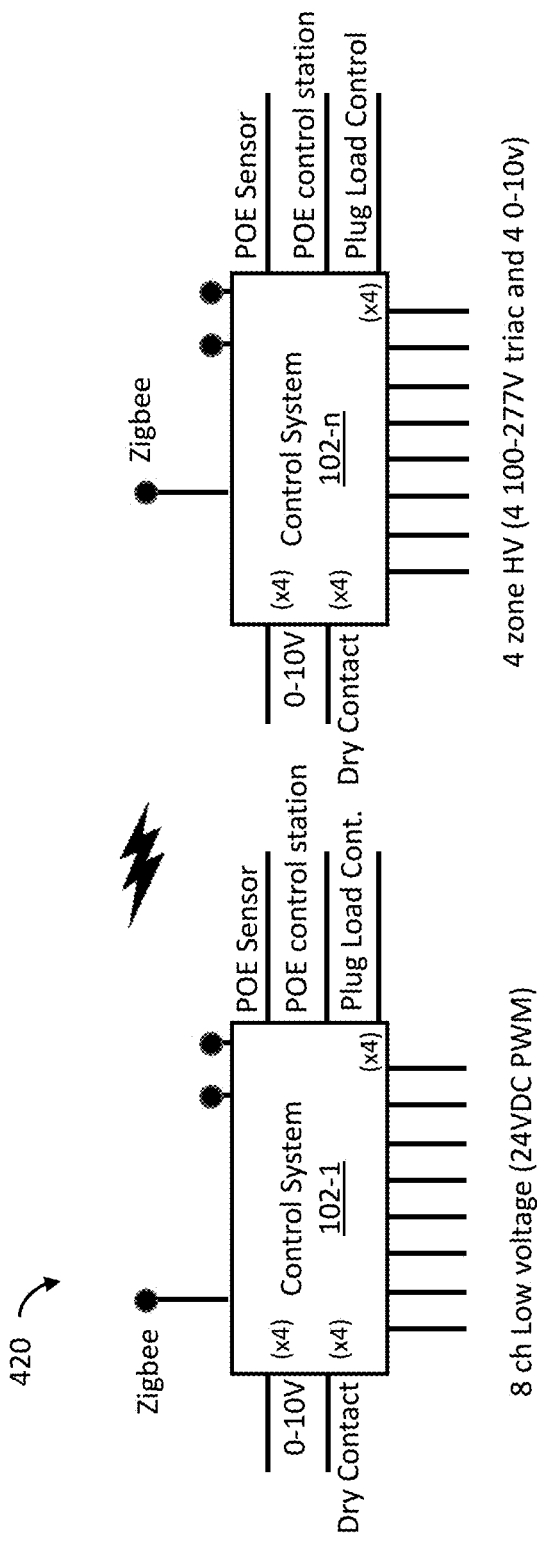
FIG. 4B is a diagram of an example lighting control system illustrating multiple control systems connected together with a wireless communication interface.

In FIG. 4B an example embodiment is shown generally at 420 where the lighting control system may include multiple control systems 102-1, 102-n connected together wirelessly through the communication interface, such as through the ZigBee protocol.

Figure 4C:
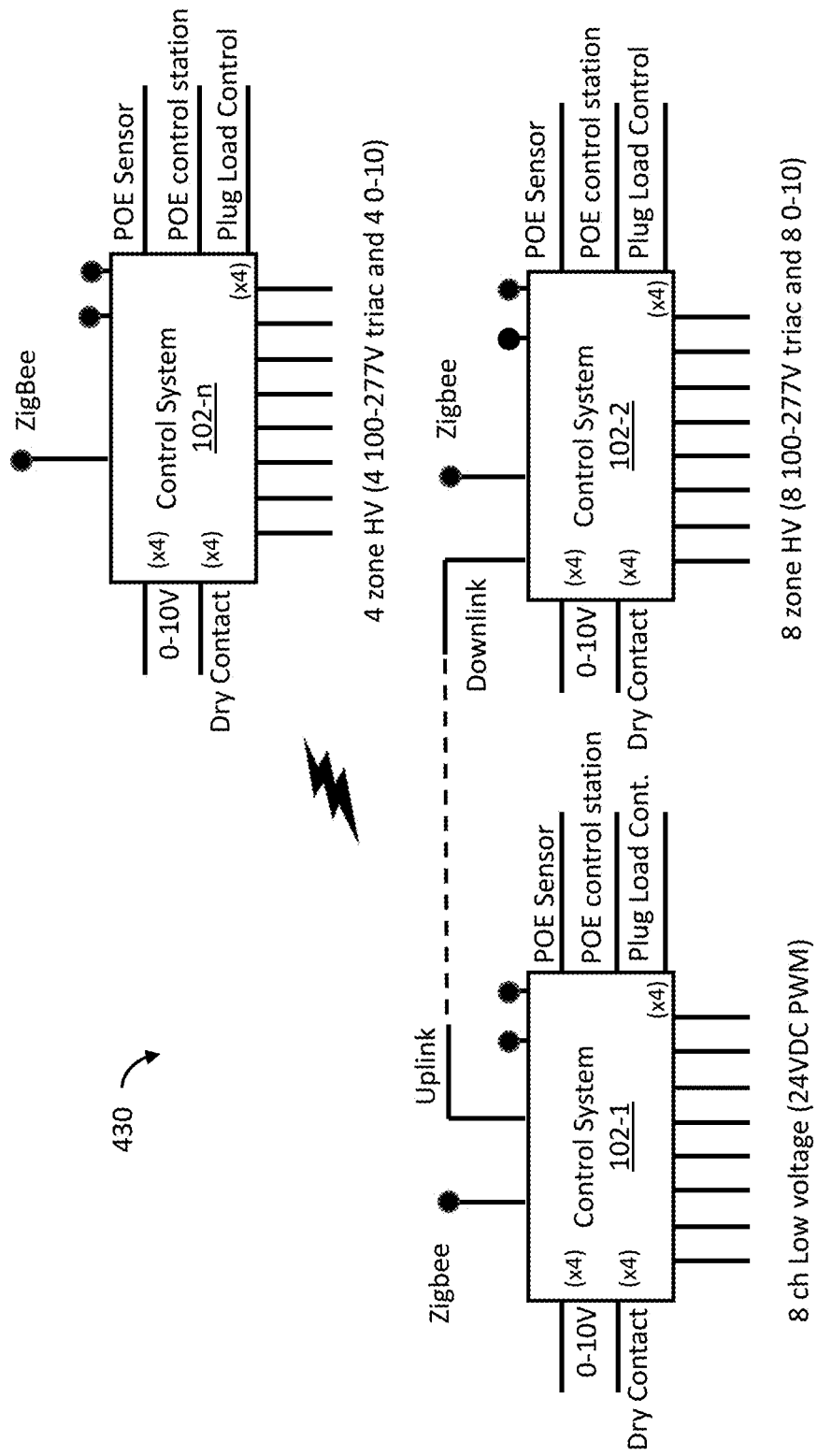
FIG. 4C is a diagram of an example lighting control system illustrating multiple control systems connected together with wired and wireless communication interfaces.

In FIG. 4C an example embodiment is shown generally at 430 where the lighting control system may include multiple control systems 102-1, 102-2, 102-n connected together, both wired and wirelessly, through the communication interface 270. As shown, a first control system 102-1 is connected via wire to a second control system 102-2. Alternatively, the connection between control system 102-1 and 102-2 may be made through an expansion module 120, as noted above. A third control system 102-n is connected to the first and second control systems 102-1, 102-2 wirelessly, through a protocol such as ZigBee. As noted above, other wireless protocols may be used as desired.

Figure 4D:
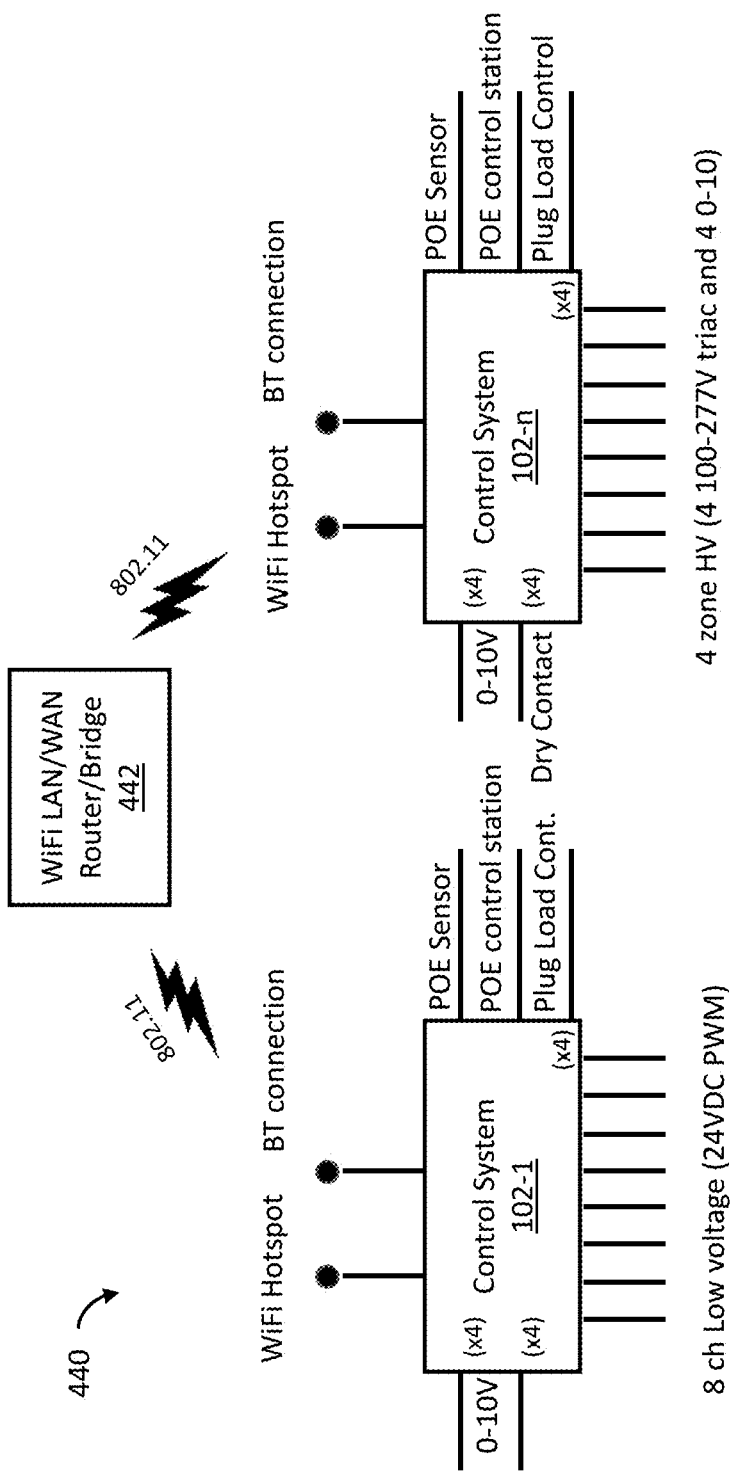
FIG. 4D is a diagram of an example lighting control system illustrating multiple control systems indirectly connected together with a wireless communication interface through a router/bridge device and/or directly connected together with a Bluetooth wireless communication interface.

In FIG. 4D an example embodiment is shown at 440 where multiple control systems 102-1, 102-n may be connected together indirectly via a device 442 such as a bridge or router, permitting lighting devices to be centrally controlled on lighting systems where the control systems 102-1, 102-n are not located within direct wired or wireless communication distance to one another. The effective use of a router or bridge type device 442 thus permits disparate lighting devices 106, 108 to be controlled in a cost effective and efficient manner, allowing large buildings and/or multiple buildings lighting to be centrally and remotely operated.

Figure 4E:
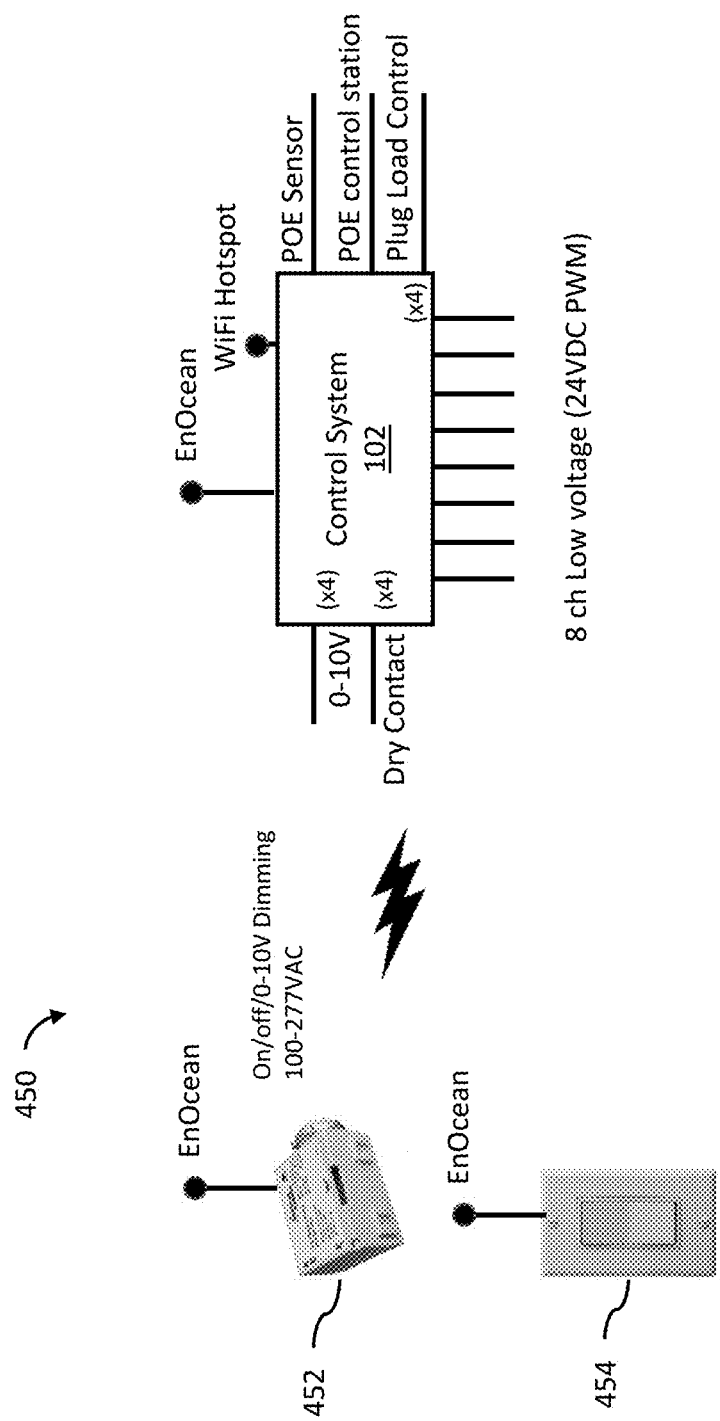
FIG. 4E is a diagram of an example lighting control system illustrating a control system wirelessly connected to switch inputs via the EnOcean protocol.

In FIG. 4E an example environment is shown at 450 illustrating a control system 102 that includes a communication interface 270 having a wireless adapter implementing EnOcean protocol that is configured to communicate with other EnOcean enabled devices, such as wall switches and dimmers, both low voltage and high voltage, to control lighting devices 106, 108.

FIGS. 5A-5I illustrate webpages that may be served by an exemplary control system 102. The control system 102 may include instructions stored in the storage component 204, that when executed, cause the processor 220 to transmit a web page through communication interface 270 to the control station 104 or user device 105. As an example, Linux operating system software may be adapted for use on the control system 102. Further, the control system may have software, such as Apache HTTP server, NGINX, Apache Tomcat, Node.js web server, or the like, to receive and respond to requests through communication interface 270. Lighting components 106, 108, and other devices connected to the control system 102, are rendered as objects that the user may manipulate seamlessly to operate, group and otherwise abstract away the hardware from the user. These "objects" are locally parsed and stored on the storage component 204 of the control system 102, thereby obviating the need for a centralized server or other infrastructure.

In addition to groups, lighting devices 106, 108 and elements of the system 100 may be organized into scenes, which may comprise, groups, individual lighting elements and particular settings applicable for all the elements included in the scene.

Figure 5A:
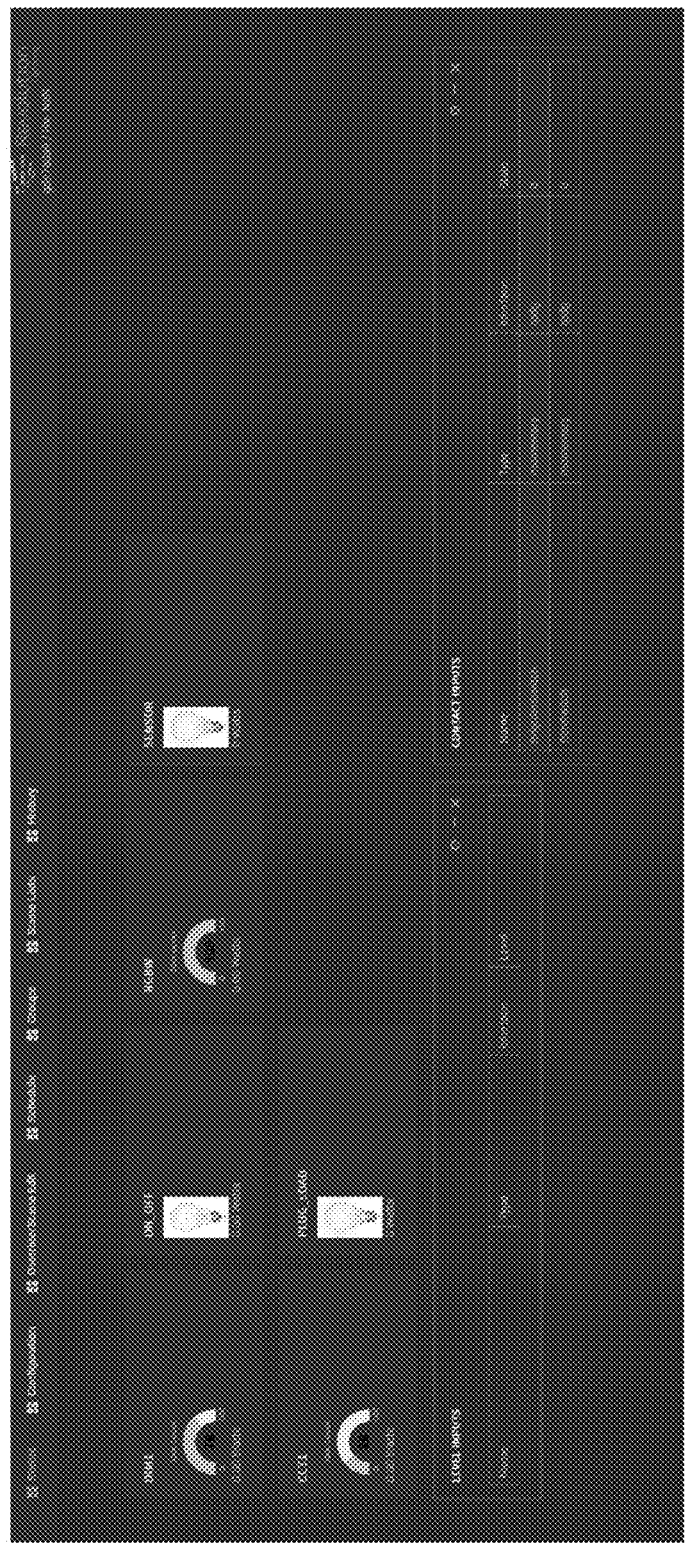
FIG. 5A is an example hosted web page for viewing the status of devices connected to the lighting control system.

FIG. 5A shows a diagram of a web page of status information for sensor 112 and lighting devices 106, 108 connected to the control system 102. For instance, dimming level and on/off information is displayed for each lighting device. Additional power consumption for each lighting device 106, 108 may be displayer.

Status information displayed for each sensor 112 may be segregated by type, including the status of occupancy and vacancy sensors; temperature, humidity detected by those types of sensor, and daylight level detected by daylight sensors, and the like. Furthermore, the status of switches connected to the system may also be determined, such as whether dry contacts are engaged and/or low voltage inputs are engaged and the voltage level.

Status information for the communication interface 270 may also be displayed for devices connected wirelessly, if enabled, to the control system 102, such as devices connected via Bluetooth, WiFi and/or ZigBee, by way of example.

Figure 5B:
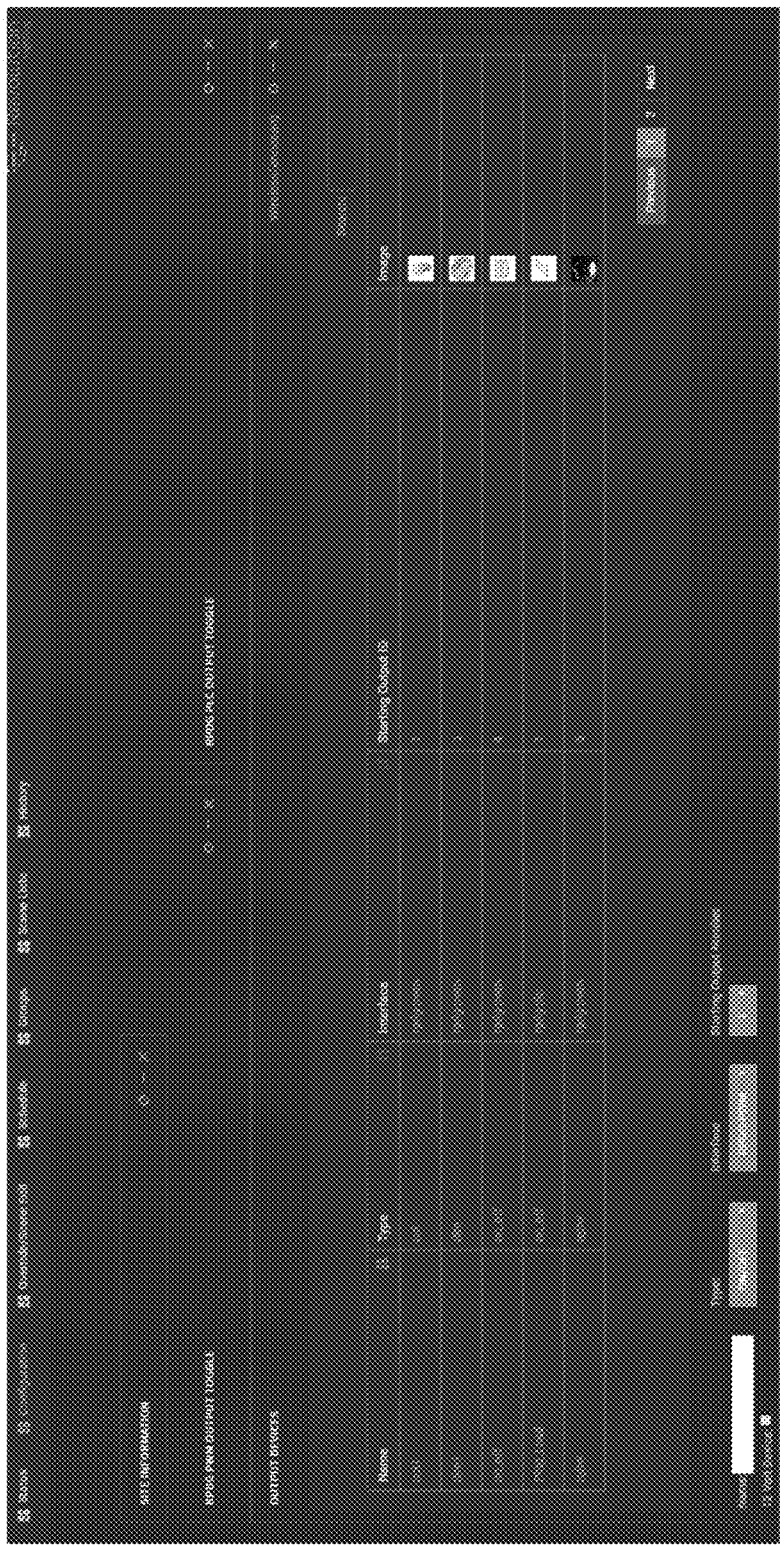
FIG. 5B is an example hosted web page for controlling lighting control outputs and other configuration information for specific lighting fixtures through the control system.

FIG. 5B illustrates an example web page that may be displayed by the control systems 102 showing configuration information for the devices connected to the system 100. Configuration information may include the name, type, interface and device identification number and an optional image of the device connected to the system, for instance. Further, devices to be added and deleted to the lighting system. For each device, inputs and outputs may be assigned to the device, including whether the device is sensor controlled or switch controlled, dimmable and/or the output control the device is connected to the control system 102. Optional configuration information may be set per device, by type, including diming options, occupancy and vacancy event settings, temperature floor and ceiling event settings, daylight floor and ceiling event settings.

Figure 5C:
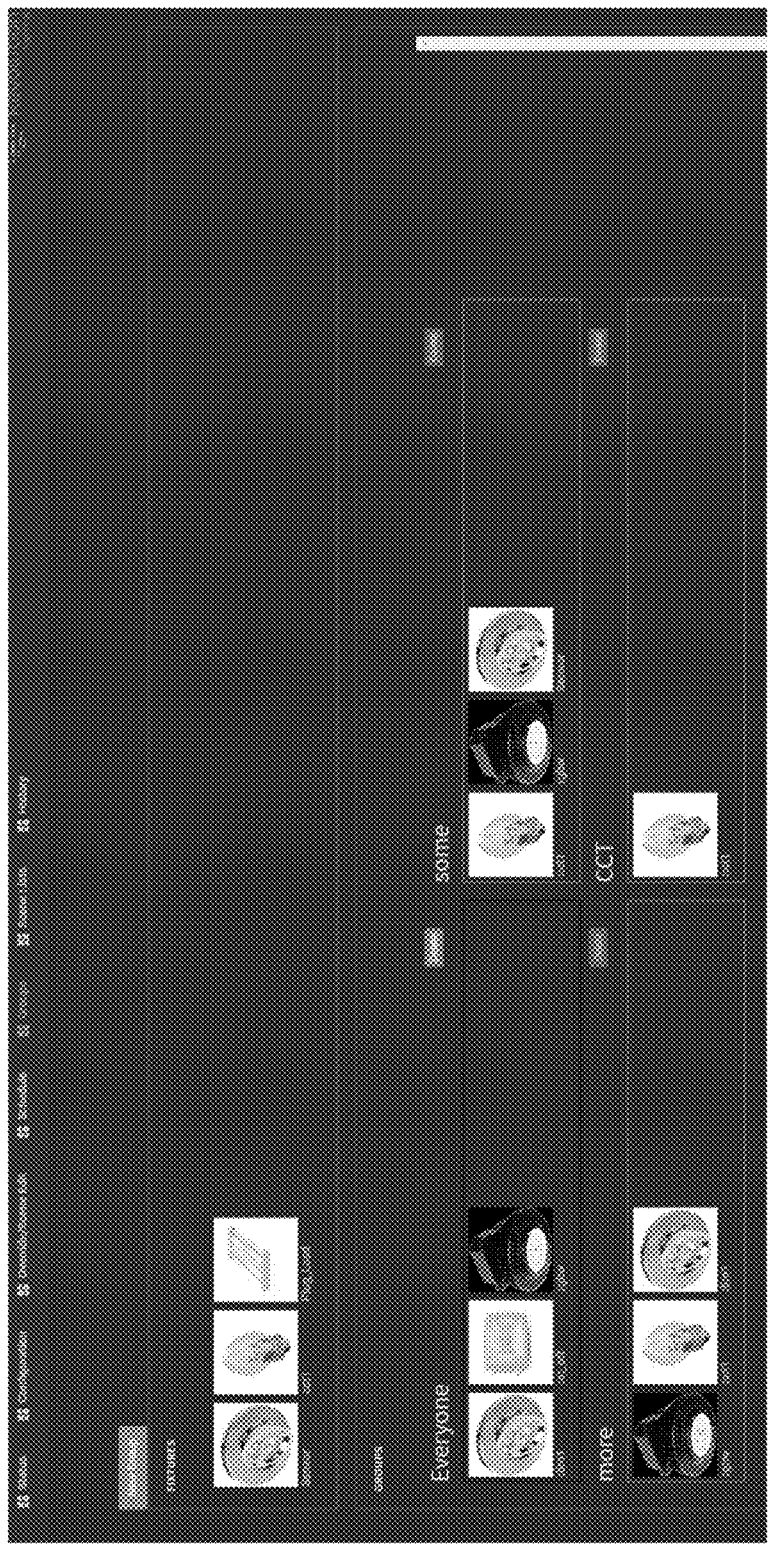
FIG. 5C is an example hosted web page for viewing and controlling lighting logical groups through the control system.

FIG. 5C shows a diagram of a web page for creating a new group of lighting devices 106, 108, through drag and drop of existing lighting devices 106, 108 connected to the control system 102.

Figure 5D:
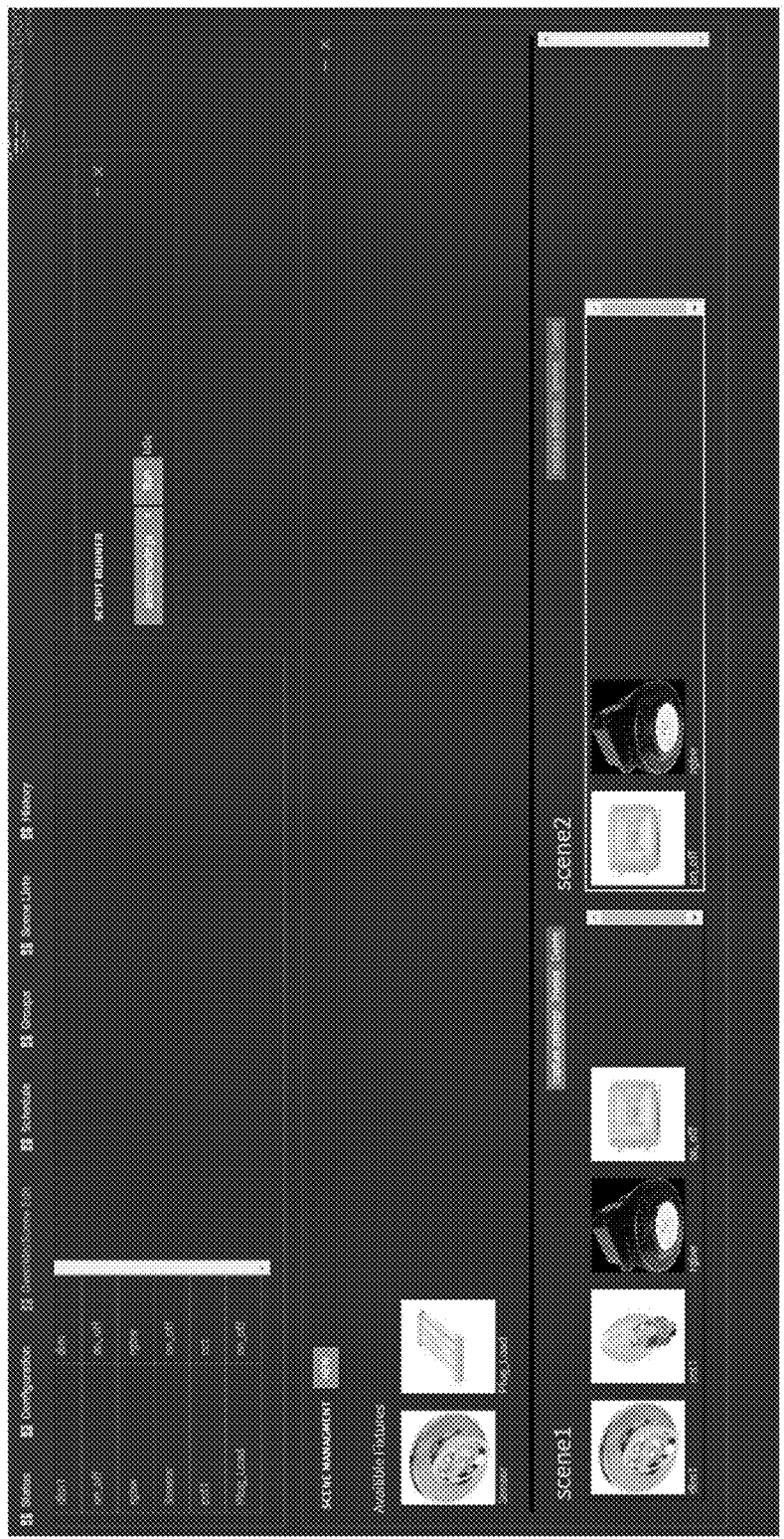
FIG. 5D is an example hosted web page for viewing and configuring scenes of lighting devices through the control system.

FIG. 5D shows a diagram of a web page for drag-and-drop creation of new scenes, comprising lighting devices and groups or lighting devices. The scenes include predefined settings for the lighting devices 106, 108, allowing entire groups and/or individual lighting devices to be activated and set to the predefined settings defined within the scene. Predefined settings include, brightness, color hue, color temperature for each of the groups and/or individual lighting devices defines as part of the scene.

Figure 5E:
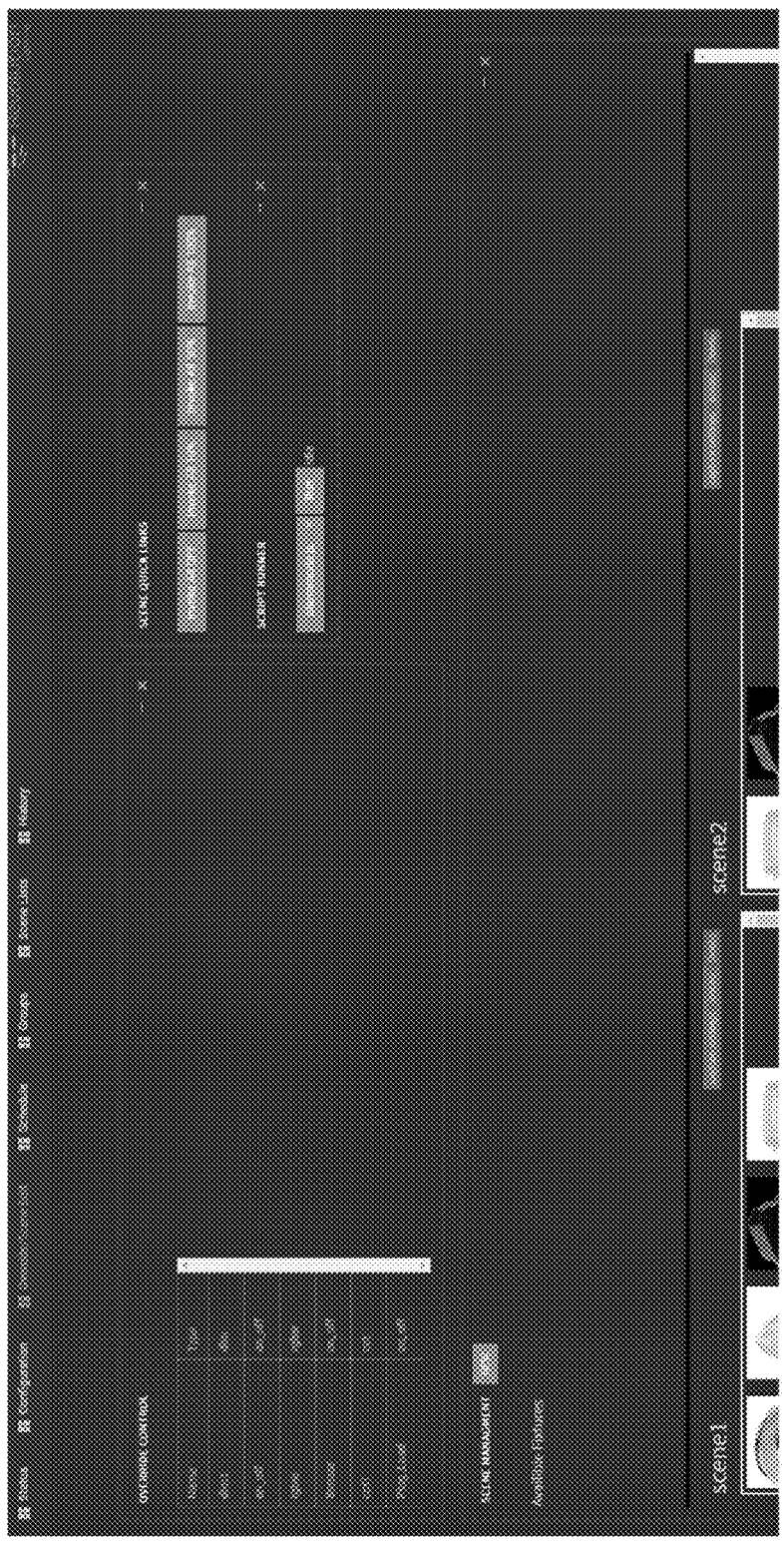
FIG. 5E is an example hosted web page for viewing and overriding presets of scenes of lighting devices through the control system.

FIG. 5E shows a diagram of a web page for overriding scene presets, including toggling all the lighting devices within the scene on/off, or setting to a brightness, such as 10%, 50% or 100%.

Figure 5F:
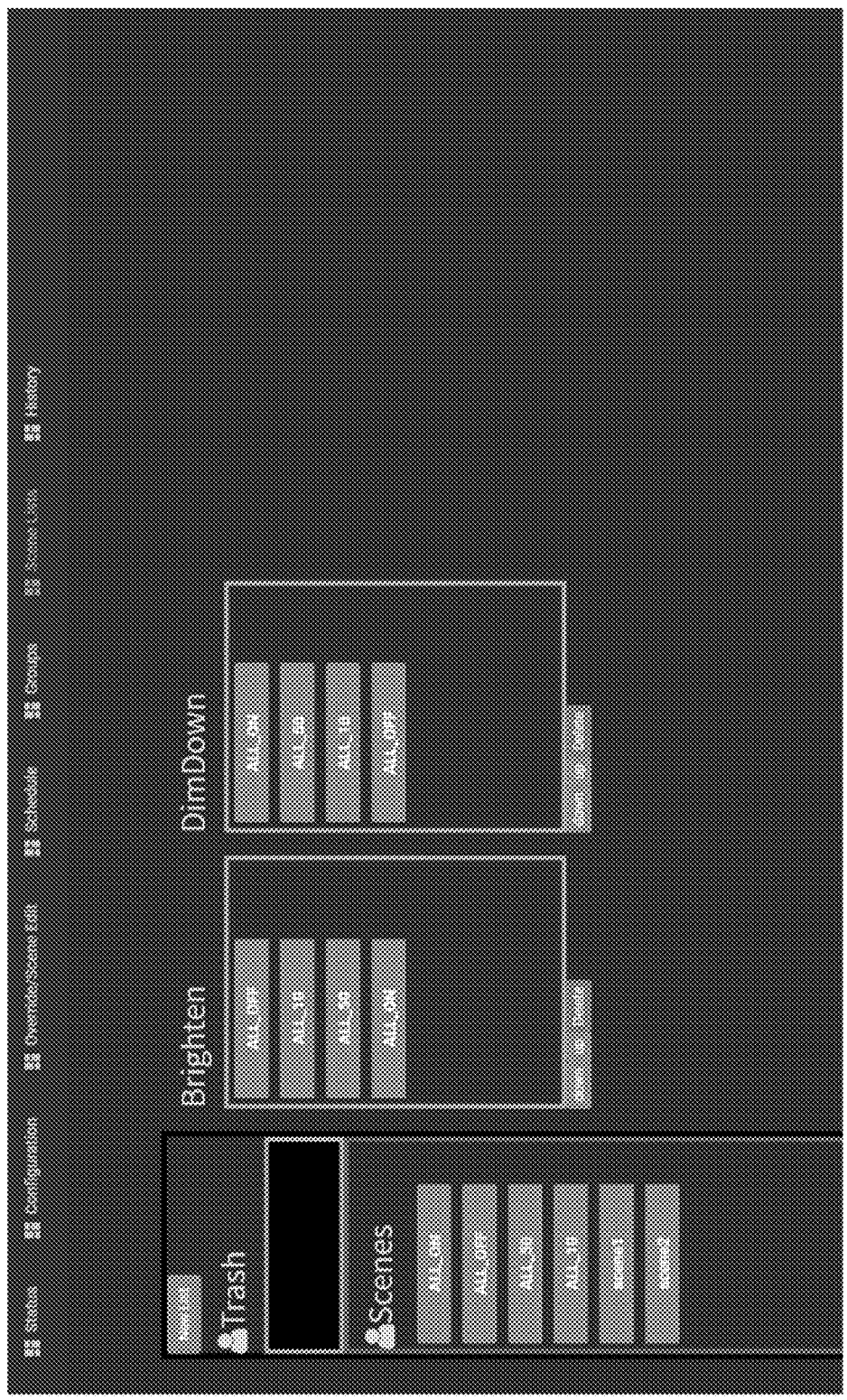
FIG. 5F is an example hosted web page for viewing and creating scene scripts for lighting devices of the system.

FIG. 5F shows a diagram of a web page for creating scene scripts, allowing multiple commands to be executed for the lighting devices 106, 108, connected to the control system 102, individually or by groups and over time intervals or preset times.

Figure 5G:
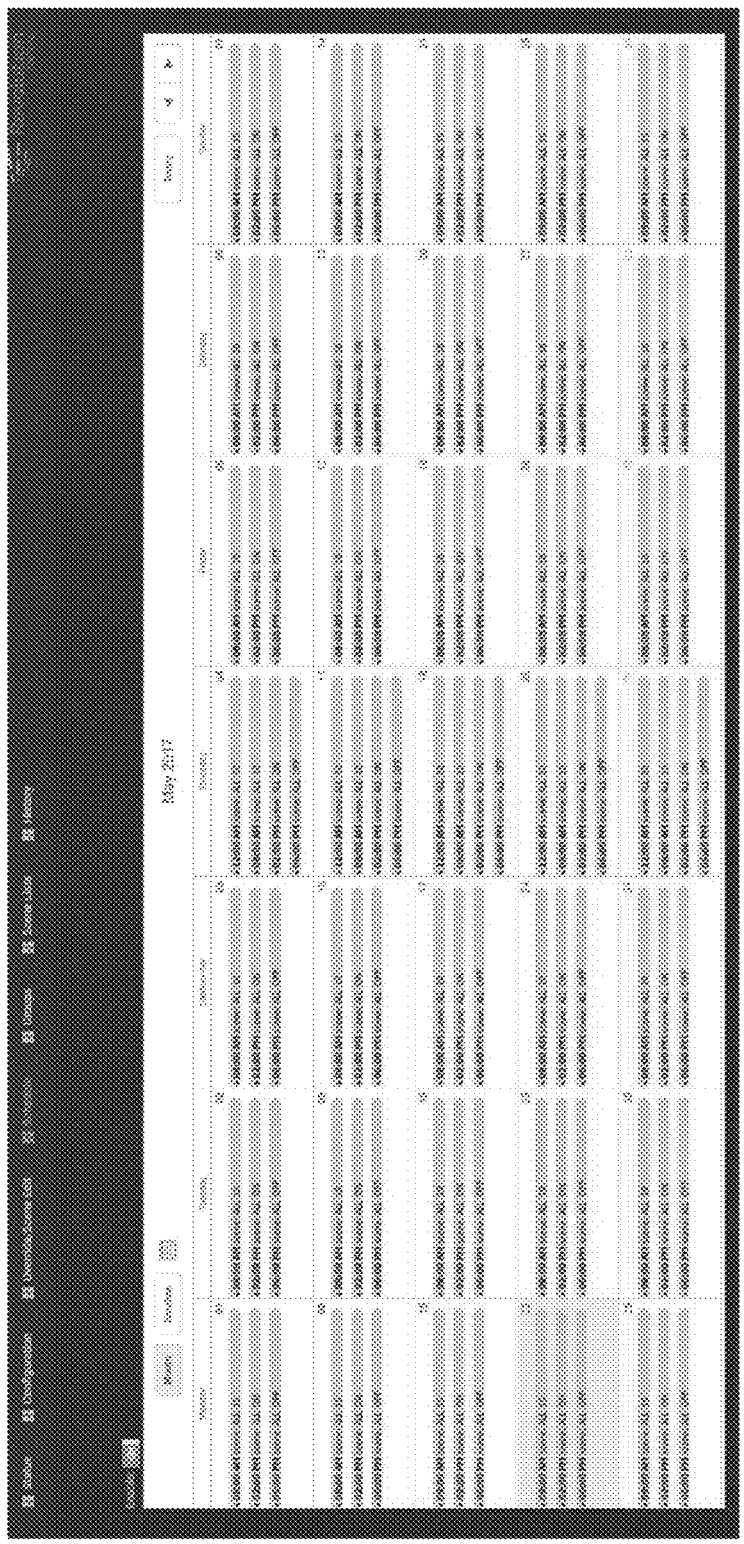
FIG. 5G is an example hosted web page for viewing scheduled operations of lighting devices through the control system
Figure 5H:
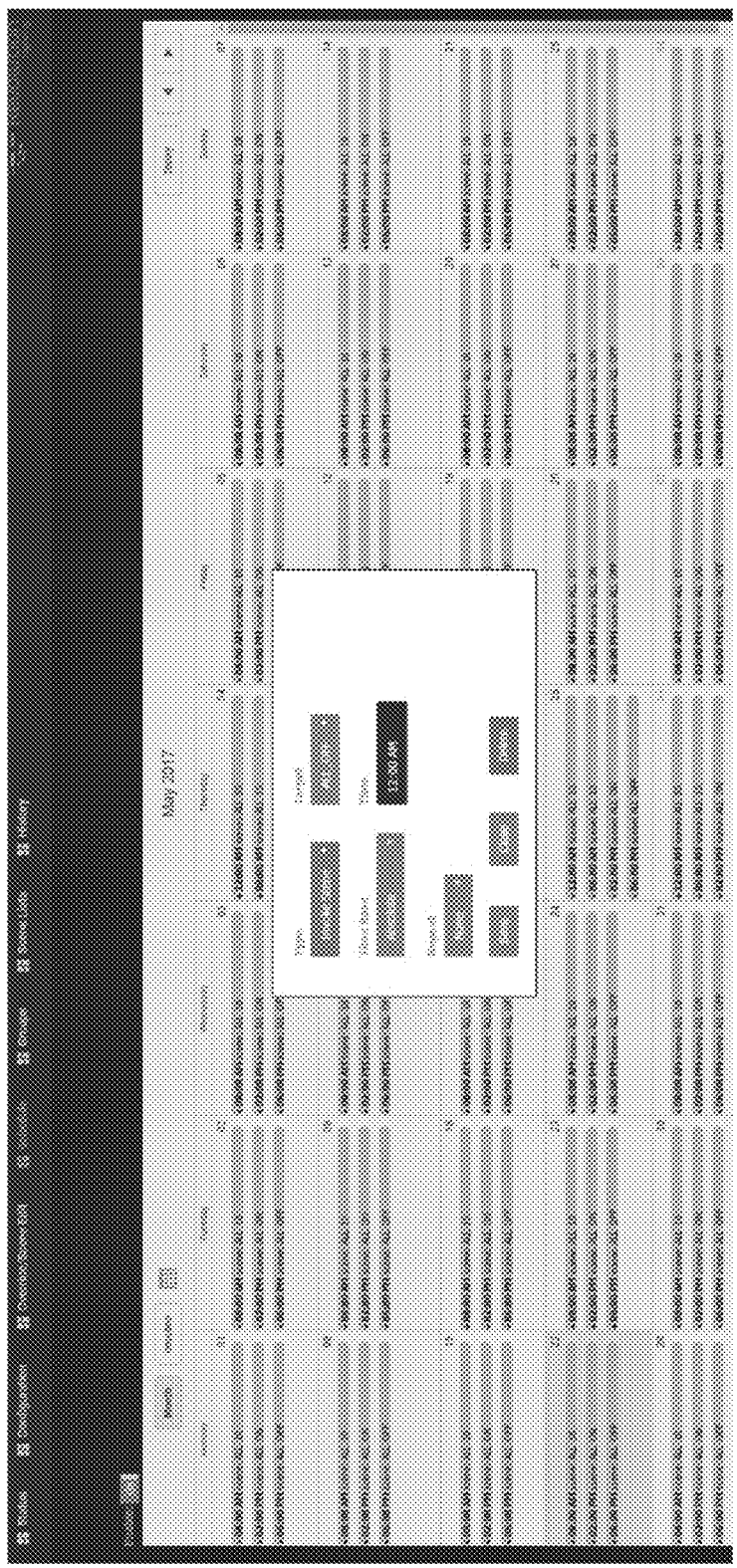
FIG. 5H is an example hosted web page for scheduling operation of lighting devices through the control system
Figure 51:
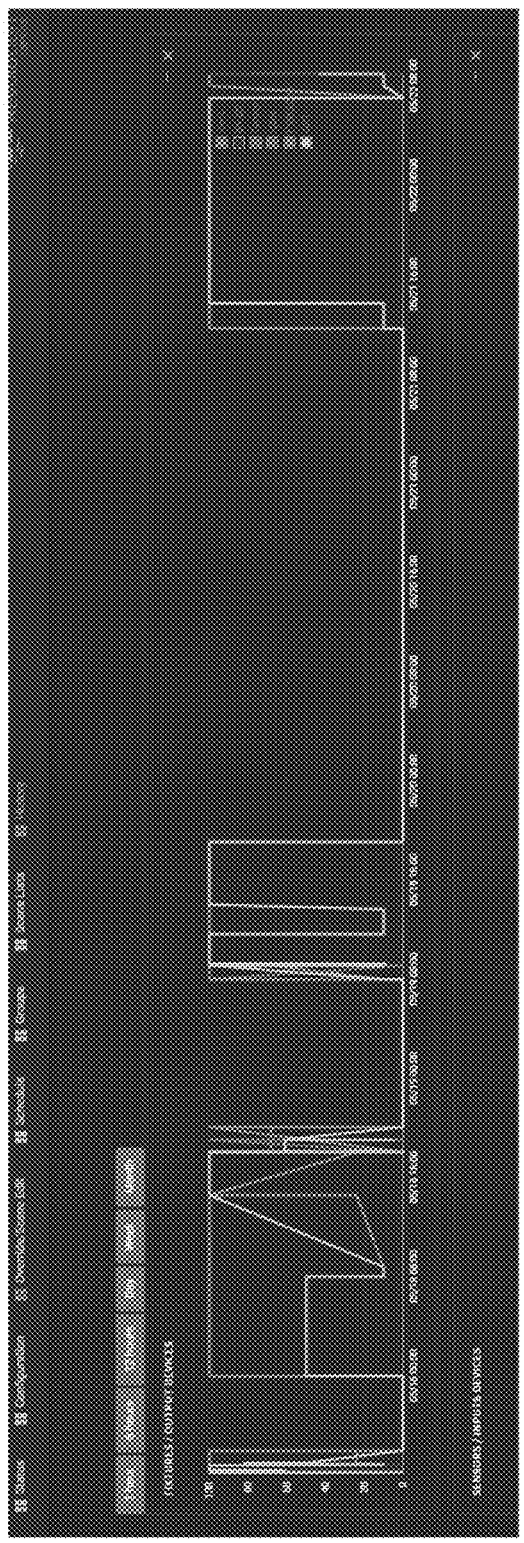

FIGS. 5G and 5H shows diagrams of web pages for scheduling operation of devices connected to the control system 102, allowing lighting devices 106, 108 to be operated by day, time and/or duration at recurring intervals as desired by the user. Lighting devices 106, 108 may be scheduled individually, by group or by scene.

FIG. 5I shows a diagram of a web page showing usage history of the system 100 by device, over a user selected time period, such as an hour, six hours, twelve hours, a day, a week or a month, for instance.

FIGS. 6A-6E illustrate webpages that may be served by an exemplary control station 104 or control system 102. The control station 104 may include instructions stored in the storage component 204, that when executed, cause the processor 220 to display a web page through on a display, such as output component 260, of the control station 104. The webpage may be stored locally in a storage component 240 of the control station 104, or retrieved from the control system 102 via a communication through communication interface 260. As an example, Linux operating system software may be adapted for use on the control station 104. Further, the control station may have software, such as web browser, or the like, to receive, render and display communications received and/or transmitted through communication interface 270. The control stations webpages includes a title bar having setting information grouped by scenes, groups, fixture control, status, and configuration information, which will be described further below.

Figure 6A:
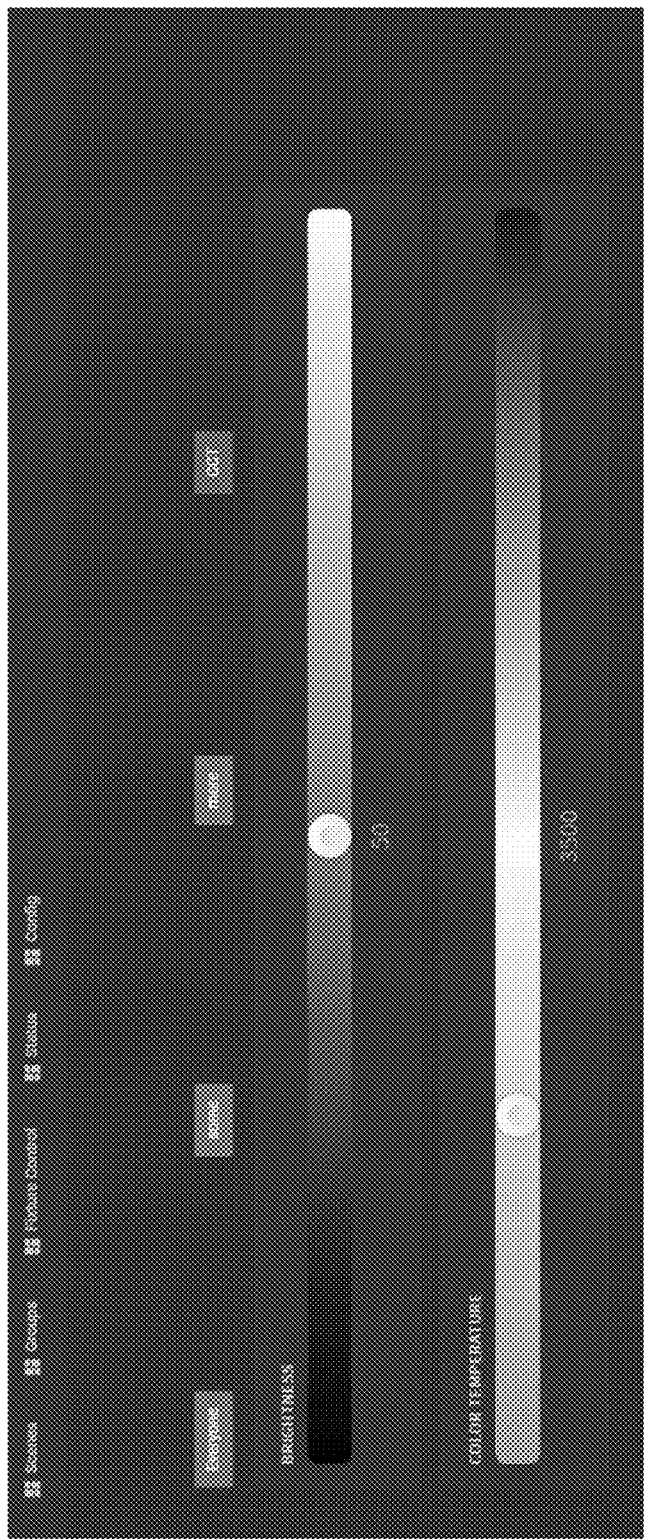
FIG. 6A is an example web page of a control station or control system for controlling groups of lighting devices.

FIG. 6A shows a diagram of a web page of a control station 104 or control system 102 group controls page, allowing the brightness and color temperature of devices in a particular group to be dimmed, switched on/off, and the color temperature to be manually controlled.

Figure 6B:
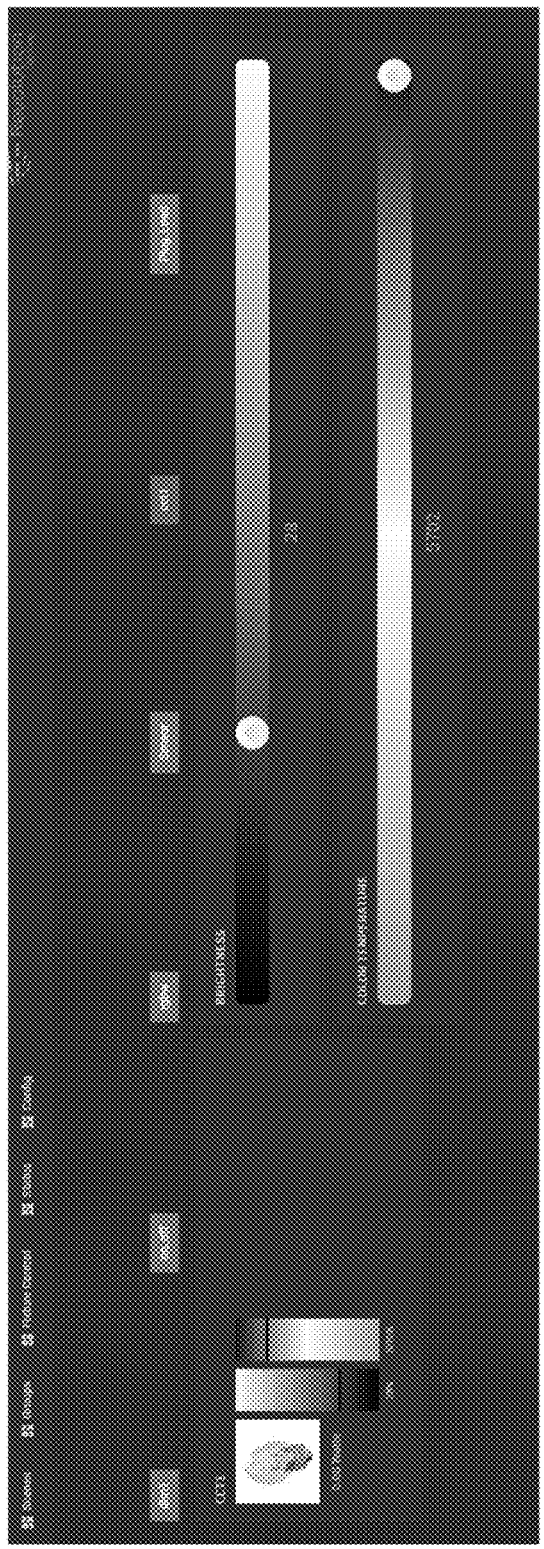
FIG. 6B is an example web page of a control station or control system for controlling color temperature and brightness of individual lighting devices.

FIG. 6B shows a diagram of a web page of a control station 104 or control station 102 individual lighting device 106, 108 control, allowing the brightness and color temperature of individual lighting devices 106, 108 to be manually controlled. The light 106, 108 may also be toggle on/off, adjust its color hue (described further below), and returned to sensor and/or pre-set settings.

Figure 6C:
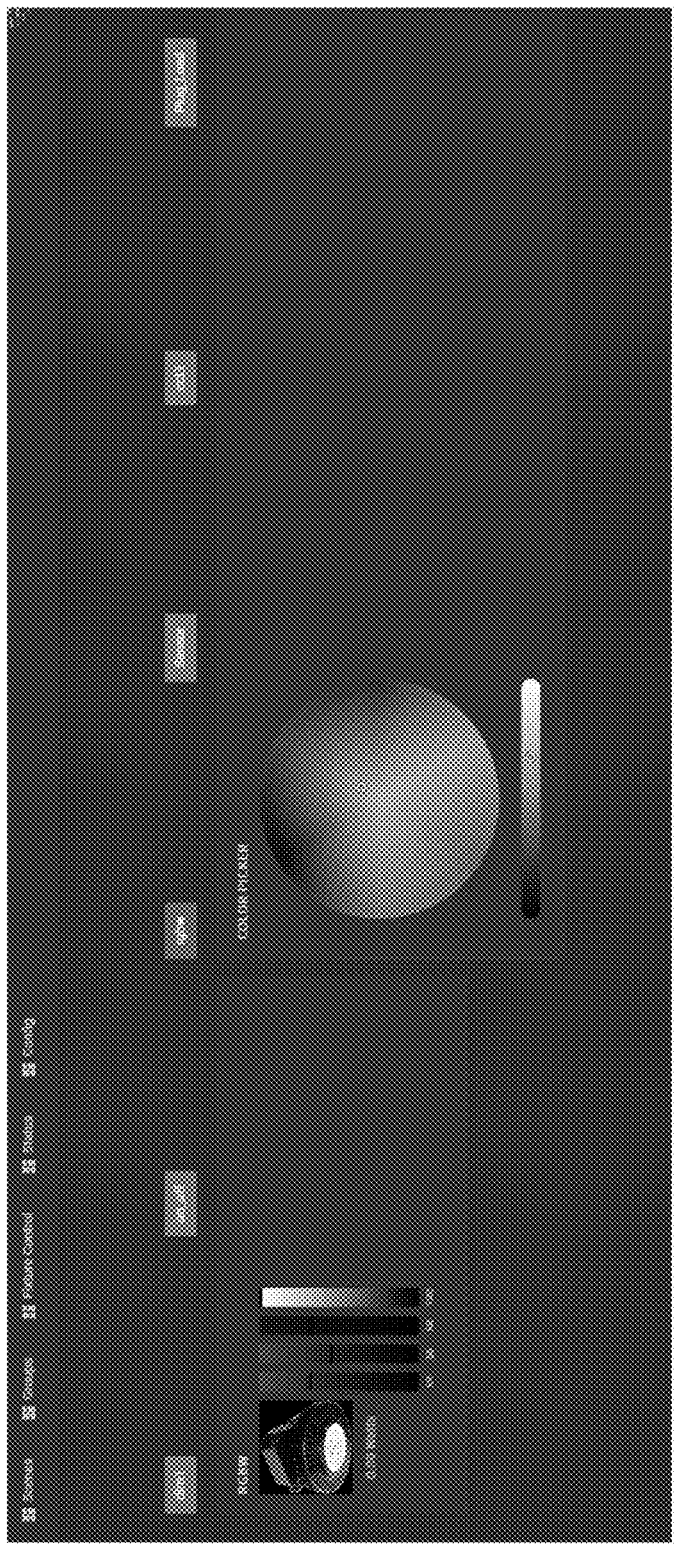
FIG. 6C is an example web page of a control station or control system for controlling color hue of individual lighting devices.

FIG. 6C shows a diagram of a web page of a control station 104 or control station 102 individual lighting device 106, 108 control, allowing the color hue of individual lighting devices 106, 108 that supports color, to be manually controlled. The user may select a color from a color picker wheel, or adjust individual sliders of red, green, blue and white to select the desired color hue.

Figure 6D:
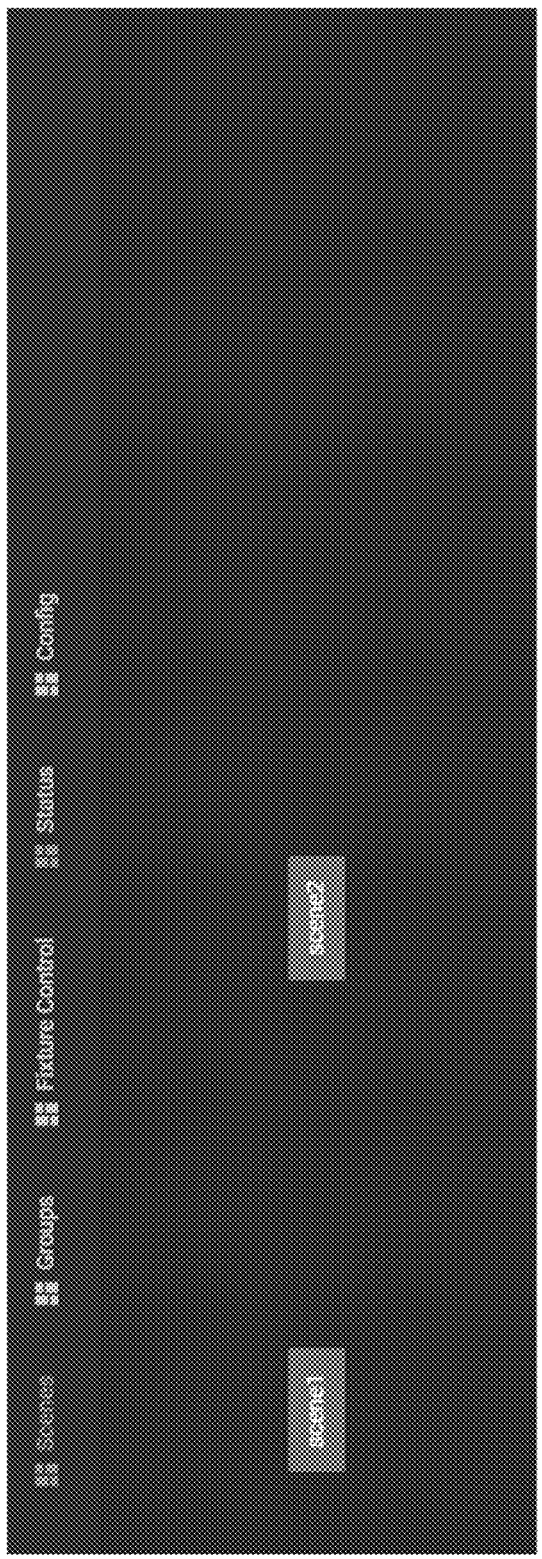
FIG. 6D is an example web page of a control station or control station scene selection screen.

FIG. 6D shows a diagram of a web page of a control system 102 or control station 104 scene selection screen, allowing user to activate the lighting settings for a scene for the system 100 or light elements specifically assigned or controlled to the control station 102. The scene selection screen allows a user to apply all preset scene information to all lighting devices simultaneously that have setting information predefined within the scene settings.

Figure 6E:
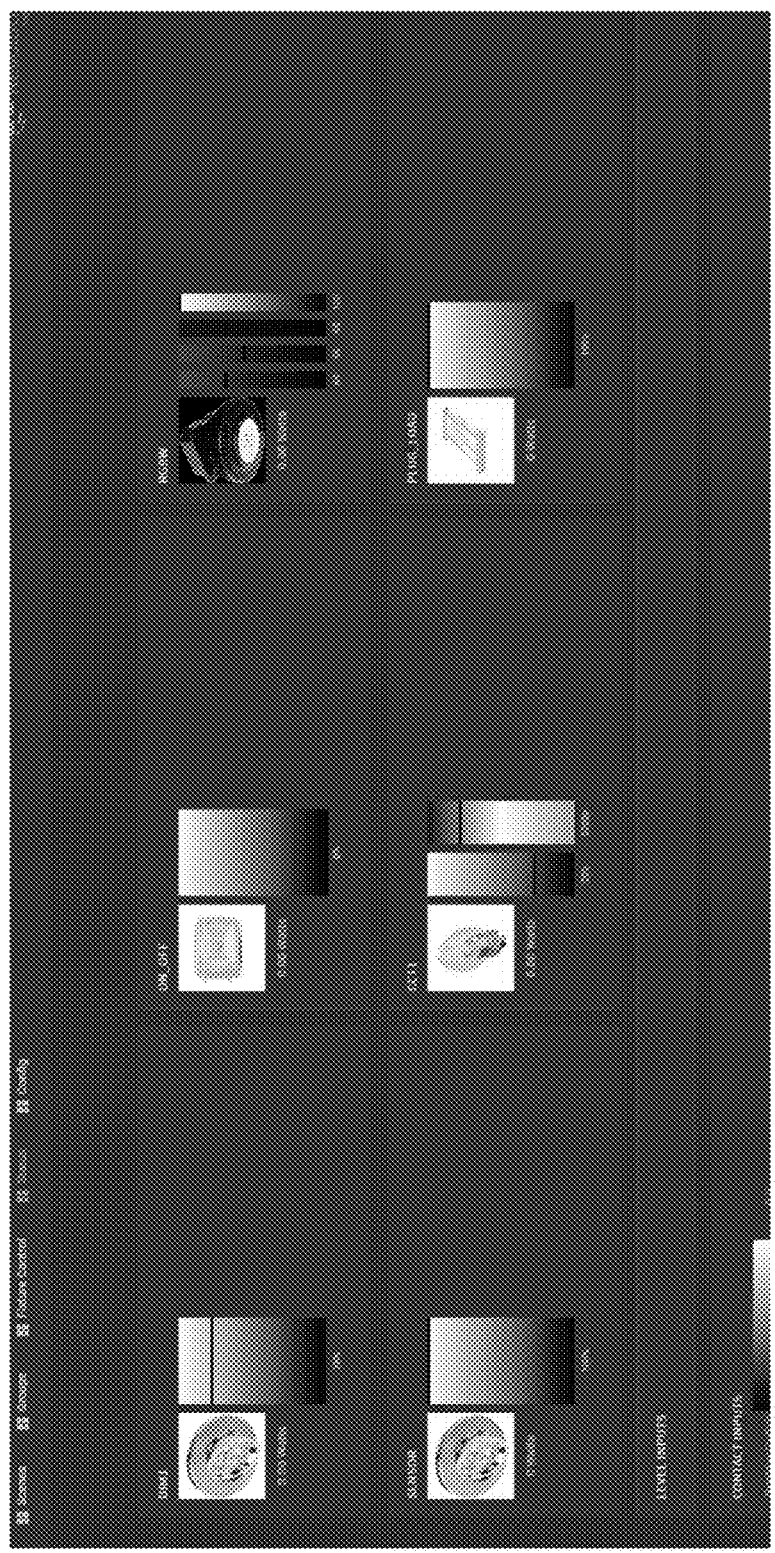
FIG. 6E is an example web page of a control station or control system status screen, showing all lighting devices connected to the system.

FIG. 6E shows a diagram of a web page of a control system 102 or control station 104 status screen, showing all lighting elements connected to the control station 102 or controllable by the control station 102. The status information includes the type of device, an optional picture of the device, whether the device is on/off, and the current settings of the device, such as color hue, brightness, and/or color temperature.

Figure 7:
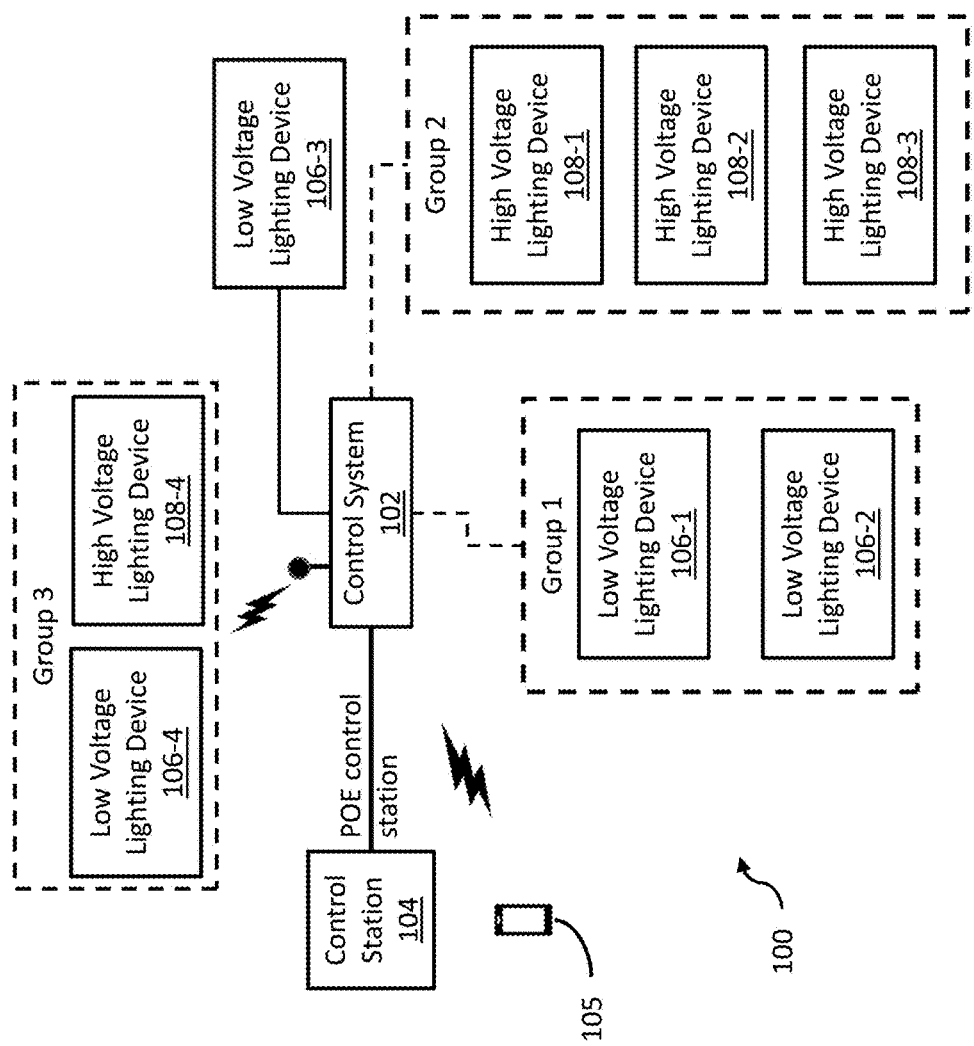
FIG. 7 is a diagram of an overview of an alighting control system illustrating lighting devices grouped together.

FIG. 7 is a diagram of an example overview of a lighting control system and devices 100, illustrating lighting devices organized into exemplary groups. For instance, low voltage lighting devices 106-1, 106-2 may be organized as Group 1, while high voltage lighting devices 108-1, 108-2, 108-3 or organized as Group 2 using control system 102 as described above in FIGS. 5A-5E. Group 1 devices may then be turned on and off, and/or dimmed, if applicable, together as a logical group via control station 104, user device 105 and/or other control inputs from remote switches, such as dry contacts or low voltage inputs. Similarly, Group 2 devices may also be operated in unison. Individual fixtures, such as low voltage lighting device 106-3, for example, may also be connected to the system and operated independently of the lighting devices in Group 1 and Group 2. Also, lighting devices or different types may be groups and operated together as illustrated with low voltage lighting device 106-4 and high voltage lighting device 108-4 organized as Group 3. Wireless control of lighting devices may also be implemented where wireless load controllers are installed on lighting devices 106, 108, as illustrated for Group 3.

The primary difference between groups and scenes is, while groups create a logical block of lighting devices that may be operated together, scenes allow complex actions for a collection of lighting devices, including groups, such as incrementally increasing the lumen output of the lights over a period of time at dusk (or the reverse for daybreak), activating light devices or groups of lighting devices sequentially, and/or periodically changing color hue of select lighting devices, for example.

Therefore, it can be seen that the lighting control system and devices described herein provide a unique solution to the problem of providing control system that includes multiple configurable options to control a variety of lighting devices, sensors and plug load devices that is centralized, yet highly customizable and expandable. The control system provides an efficient method to operate lighting devices systematically that conserves power and provides for a desirable lighting solution to commercial and residential buildings.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A device, comprising:
a processor;
a communication interface connected to the processor, the communication interface configured to receive a control input; and
a plurality of lighting control outputs connected to the processor;
wherein the processor configured to selectively operate the plurality of lighting control outputs based on the control input received by the communication interface, and
wherein the processor is configured and arranged to include a plurality of instructions that, when executed, cause the processor to:
transmit, via the communication interface, a web page with a configuration control screen, the configuration control screen having a plurality of user-settable settings thereon; and
receive, via the communication interface, posted changes to the plurality of user-settable settings.

2. The device of claim 1, wherein the plurality of lighting control outputs comprises low voltage lighting control outputs.

3. The device of claim 2, wherein the low voltage lighting control outputs comprise one or more pulse width modulated control outputs.

4. The device of claim 2, wherein the plurality of lighting control outputs comprises high voltage lighting control outputs.

5. The device of claim 4, wherein the high voltage lighting control outputs comprise one or more TRIACs.

6. The device of claim 1, wherein the plurality of lighting control outputs comprises high voltage lighting control outputs.

7. The device of claim 6, wherein the high voltage lighting control outputs comprise one or more TRIACs.

8. The device of claim 1, further comprising a plug load control and wherein the processor is configured to operate the plug load control according to a user-defined schedule.

9. The device of claim 1, further comprising a dry contact input configured to cause the processor to selectively operate the plurality of lighting control outputs.

10. The device of claim 1, further comprising a low voltage input configured to cause the processor to selectively operate the plurality of lighting control outputs.

11. The device of claim 1, further comprising:
a sensor connected to the processor, the sensor having a sensor input;
the processor further configured to selectively operate the plurality of lighting control outputs based on the sensor input received by the sensor.

12. The device of claim 11, wherein the sensor is selected from the group consisting of: daylight sensors, temperature sensors, humidity sensors, passive infrared sensors, occupancy sensors, vacancy sensors, ultrasonic sensors, and vibration sensors.

13. The device of claim 1, wherein the plurality of instructions comprises instructions that, when executed, cause the processor to:
selectively operate lighting control outputs according to user-settable settings received.

14. The device of claim 1, wherein the plurality of instructions comprises instructions that, when executed, cause the processor to:
selectively group lighting control outputs logically together to be operatively controlled as a unit according to user-settable settings received.

15. The device of claim 1, wherein the plurality of instructions comprises instructions that, when executed, cause the processor to:
selectively schedule lighting control outputs to operate at desired days, times, or durations according to user-settable settings received.

16. The device of claim 1, wherein the communication interface comprises a wireless transmitter/receiver.

17. The device of claim 1, wherein the communication interface comprises a wired transmitter/receiver.

18. The device of claim 17, wherein the wired transmitter/receiver comprises an ethernet device.

19. The device of claim 1, further comprising a control station connected to the communication interface, the control station configured to generate control inputs and transmit them through the communication interface.

20. The device of claim 1, further comprising an expansion module connected to the communication interface.

* * * * *